(12) United States Patent
Yadegari et al.

(10) Patent No.: US 11,990,110 B2
(45) Date of Patent: May 21, 2024

(54) METHODS AND SYSTEMS FOR REAL-TIME SOUND PROPAGATION ESTIMATION

(71) Applicant: The Regents of the University of California, Oakland, CA (US)

(72) Inventors: Shahrokh Yadegari, La Jolla, CA (US); Louis Pisha, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 163 days.

(21) Appl. No.: 17/454,238

(22) Filed: Nov. 9, 2021

(65) Prior Publication Data

US 2022/0148549 A1 May 12, 2022

Related U.S. Application Data

(60) Provisional application No. 63/112,568, filed on Nov. 11, 2020.

(51) Int. Cl.
| | |
|---|---|
| *G10K 11/04* | (2006.01) |
| *G06F 30/20* | (2020.01) |
| *H04R 1/20* | (2006.01) |
| *H04S 7/00* | (2006.01) |

(52) U.S. Cl.
CPC .............. *G10K 11/04* (2013.01); *G06F 30/20* (2020.01); *H04R 1/20* (2013.01); *H04S 7/30* (2013.01)

(58) Field of Classification Search
None
See application file for complete search history.

(56) References Cited

U.S. PATENT DOCUMENTS

| | | | |
|---|---|---|---|
| 2002/0052685 A1* | 5/2002 | Kamiya | G01C 21/36 701/408 |
| 2011/0017545 A1* | 1/2011 | Pompei | G10K 11/175 181/296 |
| 2019/0356999 A1* | 11/2019 | Raghuvanshi | H04S 7/304 |

OTHER PUBLICATIONS

Antani, L., Chandak, A., Taylor, M., and Manocha, D., "Fast geometric sound propagation with finite edge diffraction," Technical Report TRI0-011, University of North Carolina at Chapel Hill, 17 pages (2010).
Biot, M. A. and Tolstoy, I., "Formulation of wave propagation in infinite media by normal coordinates with an application to diffraction,"J. Acoust. Soc. Am. 29(3), 381-391 (1957).

(Continued)

*Primary Examiner* — Duc Nguyen
*Assistant Examiner* — Assad Mohammed
(74) *Attorney, Agent, or Firm* — Perkins Coie LLP

(57) ABSTRACT

Methods and systems for estimating diffraction effects during sound propagation in a scene, which include generating, for each distance value from distance values, a subpath between a first point of the scene and a second point of the scene passing through a third point of the scene which is at a distance from a path between the first point and the second point equal to the distance value. Furthermore, for each generated subpath, a transmission value related to a degree of occlusion of the subpath by objects in the scene is determined. Also, a diffraction amplitude response is determined using a first transmission value determined for a first subpath generated for a first distance value from the distance values and a second transmission value determined for a second subpath generated for a second distance value from the distance values.

26 Claims, 18 Drawing Sheets

(56) References Cited

OTHER PUBLICATIONS

Calamia, P. T. and Svensson, U. P., "Fast time-domain edge-diffraction calculations for interactive acoustic simulations," EURASIP J. Appl. Signal Proc. 2007(1), 063560 (2007).
Calamia, P. T., Markham, B. E., and Svensson, U. P., "Diffraction culling for virtual-acoustic simulations," Acta Acust. united Ac. 94(6), 907-920 (2008).
Chandak, A., Lauterbach, C., Taylor, M., Ren, Z., and Manocha, D., "A·frustum: Adaptive frustum tracing for interactive sound propagation," IEEE Trans. Visual. Comput. Graph. 14(6), 1707-1722 (2008).
D. Botteldooren, "Finite-difference time-domain simulation of lo··frequency room acoustic problems," J. Acoust. Soc. Am. 98(6), 3302-3308 (1995).
Dear Reality GmbH, "DearVR: Ultimate tools for immersive 3D audio production," https:f/www.dearvr.com (Last viewed May 14, 2019).
Funkhouser, T., P. Min, and I. Carlbom, "Real-time acoustic modeling for distributed virtual environments," in Proceedings of the 26th Annual Conference on Computer Graphics and Interactive Techniques (ACM Press/Addison-Wesley Publishing Co., 1999), pp. 365-374.
Google, "Resonance audio: Fundamental concepts," (2017) https:/1 resonance-audio.github.io/resonance-audio/discover/concepts.html (Last viewed Jun. 4, 2020).
Kouyoumjian, R. G. and Pathak, P. H., "A uniform geometrical theory of diffraction for an edge in a perfectly conducting surface," Proc. IEEE 62(11), 1448-1461 (1974).
Litovsky, R. Y., Colburn, H. S., W. A. Yost, and S. J. Guzman, "The prece dence effect," J. Acoust. Soc. Am. 106(4), 1633-1654 (1999). See supplementary material at https:f/doi.org/10.1121/10.0002115 for the Python diffraction scripts' source code.
Medwin, H., "Shadowing by finite noise barriers," J. Acoust. Soc. Am. 69(4), 1060-1064 (1981).
Medwin, H., Childs, E., and Jebsen, G. M., "Impulse studies of double di··fraction: A discrete Huygens interpretation," J. Acoust. Soc. Am. 72(3), 1005-1013 (1982).
Moore, F. R., "A general model for spatial processing of sounds," Comp. Music J. 7(3), 6-15 (1983).
Murphy, D., A. Kelloniemi, J. Mullen, and S. Shelley, "Acoustic modeling using the digital waveguide mesh," IEEE Signal Process. Mag. 24(2), 55-66 (2007).
NVIDIA Corporation, "CUDA zone," (2019) https:f/developer. nvidia. com/cuda-zone (Last viewed Jan. 20, 2019).
NVIDIA Corporation, "NVIDIA VRWorks—audio," https:// developer. nvidia.com/vrworks/vrworks-audio (Last viewed Feb. 19, 2019).

Pulkki, V. and Svensson, U. P., "Machine-learning-based estimation and rendering of scattering in virtual reality," J. Acoust. Soc. Am. 145(4), 2664-2676 (2019).
Salomons, E. , Van Maercke, D., Defrance, J., and F. de Roo, "The har·monoise sound propagation model," Acta Acust. united Ac. 97(1), 62-74 (2011).
Schissler, C. and Manocha, D., "Gsound: Interactive sound propagation for games," in Audio Engineering Society Conference: 41st International Conference: Audio for Games (Audio Engineering Society, London, 2011).
Schissler, C., Mehra, R., and Manocha, D., "High-order diffraction and dif·fuse reflections for interactive sound propagation in large environments," ACM Trans. Graphics (TOG) 33(4), 39 (2014).
Stephenson, U. M., "An energetic approach for the simulation of diffraction within ray tracing based on the uncertainty relation," Acta Acust. united Ac. 96(3), 516-535 (2010).
Stephenson, U. M., "Simulation of multiple sound particle diffraction based on the uncertainty relation: A revolution in noise immission pro··nosis; Part I: Principle and method," in Proc. of Euronoise (2018).
Summers, J. E., "Inaccuracy in the treatment of multiple-order diffraction by secondary-edge-source methods," J. Acoust. Soc. Am. 133(6), 3673-3676 (2013).
Svensson, U. P. and Calamia, P. T., "Edge-diffraction impulse responses near specular-zone and shadow-zone boundaries," Acta Acust. united Ac. 92(4), 501-512 (2006).
Svensson, U. P., Fred, R. I., and Vanderkooy, J., "An analytic secondary source model of edge diffraction impulse responses," J. Acoust. Soc. Am. 106(5), 2331-2344 (1999).
Szirmay-Kalos, L. and Marton, G. , "Worst-case versus average case complexity of ray-shooting," Computing 61(2), 103-131 (1998).
T. Kawai, "Sound diffraction by a many-sided barrier or pillar," J. Sound Vib. 79(2), 229-242 (1981).
Tsingos, N. and Gascuel, J.-D., "Soundtracks for computer animation: Sound rendering in dynamic environments with occlusions," in Graphics Inte,face '97, Kelowna, Canada (1997), https://hal.inria. fr/inria-00510105.
Tsingos, N., Funkhouser, T., Ngan, A., and Carlbom, I., "Modeling acous·tics in virtual environments using the uniform theory of diffraction," in Proceedings of the 28th Annual Conference on Computer Graphics and Interactive Techniques, ACM (2001), pp. 545-552.
Valve Corporation, "A benchmark in immersive audio solutions for games and YR," https://valvesoftware.github.io/steam-audio/ (Last viewed May 23, 2019).
Weigand, S., Stephenson, U. M., and Schaal, J., "Simulation of multiple sound particle diffraction based on the uncertainty relation: A revolution in noise immission prognosis; Part II: Evaluation by measurements," in Proc. of Euronoise (2018).
Yadegari, S., "Inner room extension of a general model for spatial proces··ing of sounds," in Proc. International Computer Music Conference, Barcelona, Spain (2005), pp. 1-4.

* cited by examiner

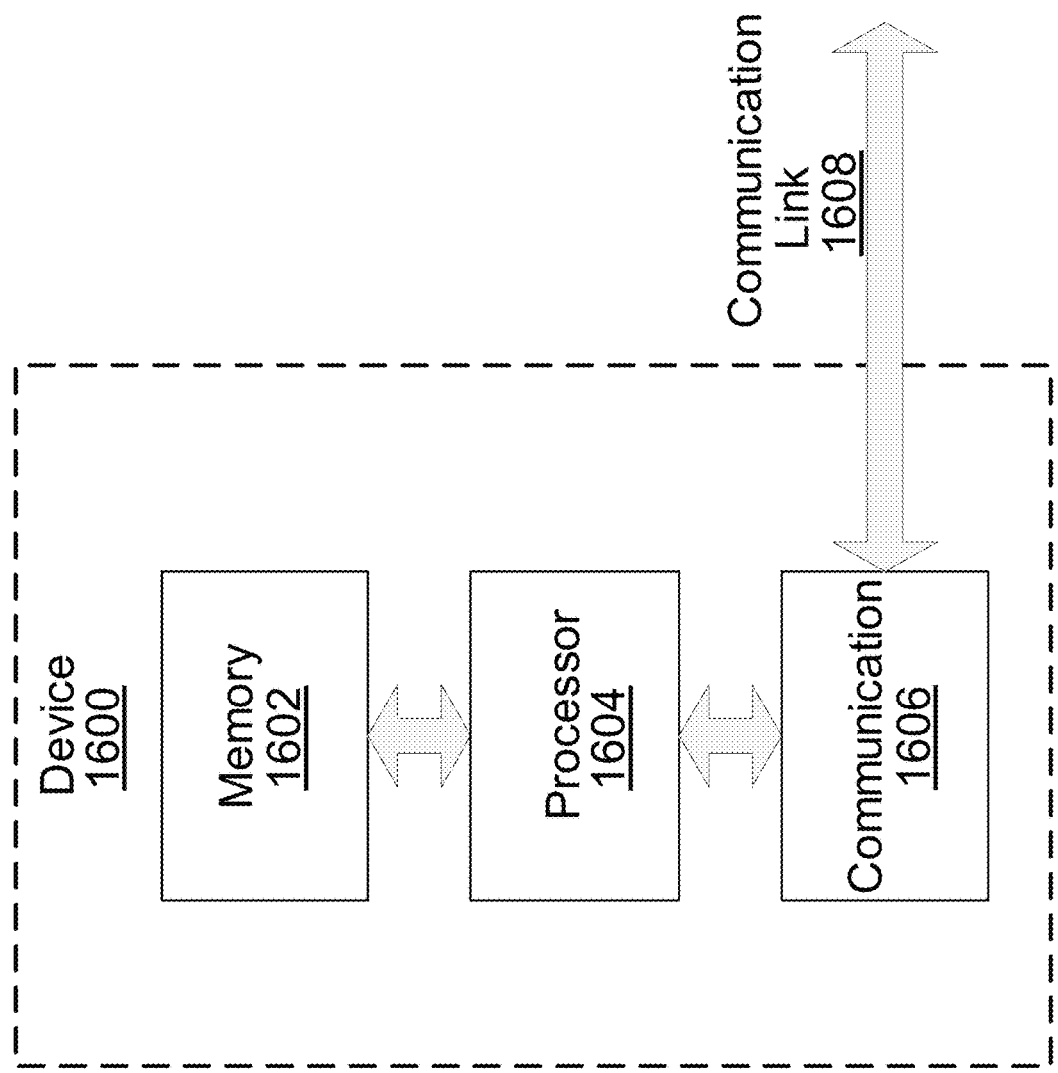

1700

- obtaining a path between the first point and the second point  1010
- selecting a plurality of distance values associated with the path  1020
- for each distance value: generating a subpath that passes through a third point located between the first point and the second point, wherein a separation between the third point and the path is equal to the distance value; and determining, for the subpath, a transmission value corresponding to a degree of occlusion of the subpath by the one or more objects  1030
- determining a value of a diffraction amplitude response for propagation of the sound waves between the first point and the second point using a first transmission value determined for a first subpath generated for a first distance value and a second transmission value determined for a second subpath generated for a second distance value, wherein the second distance value is different from the first distance value  1040

FIG. 17

METHODS AND SYSTEMS FOR REAL-TIME SOUND PROPAGATION ESTIMATION

RELATED APPLICATIONS

This patent document claims priority to and benefits of U.S. Provisional Patent Application No. 63/112,568 entitled, "APPROXIMATE DIFFRACTION MODELING FOR REAL-TIME SOUND PROPAGATION SIMULATION" and filed on Nov. 11, 2020. The entire contents of the before-mentioned patent application are incorporated by reference as part of the disclosure of this patent document.

TECHNICAL FIELD

The subject matter of this patent document relates to acoustics and, particularly, to methods and devices for real-time sound propagation determination that include sound diffraction effects.

BACKGROUND

Convincing reproduction of sound diffraction effects is important for sound generation in virtual environments. Wavefield and ray-based diffraction techniques may be used for that purpose.

SUMMARY

The devices and techniques based on the disclosed technology can be used, for example, to create realistic acoustic environments for virtual and/or augmented reality applications in real time.

An aspect of the disclosed embodiments relates to a method of estimating diffraction of sound waves that travel from a first point to a second point in an environment that includes one or more objects that includes obtaining a path between the first point and the second point. The method further includes selecting a plurality of distance values associated with the path. Furthermore, the method includes, for each distance value: generating a subpath that passes through a third point located between the first point and the second point, wherein a separation between the third point and the path is equal to the distance value, and determining, for the subpath, a transmission value corresponding to a degree of occlusion of the subpath by the one or more objects. The method also includes determining a value of a diffraction amplitude response for propagation of the sound waves between the first point and the second point using a first transmission value determined for a first subpath generated for a first distance value and a second transmission value determined for a second subpath generated for a second distance value, wherein the second distance value is different from the first distance value.

Another aspect of the disclosed embodiments relates to a system for estimating diffraction of sound waves that travel from a first point to a second point in an environment that includes one or more objects, which includes a processor and a memory comprising processor executable instructions which, upon execution by the processor, cause the processor to obtain a path between the first point and the second point. The processor executable instructions, upon execution by the processor, further cause the processor to select a plurality of distance values associated with the path. Furthermore, the processor executable instructions, upon execution by the processor, cause the processor, for each distance value, to generate a subpath that passes through a third point located between the first point and the second point, wherein a separation between the third point and the path is equal to the distance value and determine, for the subpath, a transmission value corresponding to a degree of occlusion of the subpath by the one or more objects. The processor executable instructions, upon execution by the processor, also cause the processor to determine a value of a diffraction amplitude response for propagation of the sound waves between the first point and the second point using a first transmission value determined for a first subpath generated fora first distance value and a second transmission value determined for a second subpath generated for a second distance value, wherein the second distance value is different from the first distance value.

Those and other aspects of the disclosed technology and their implementations and examples are described in greater detail in the drawings, the description and the claims.

BRIEF DESCRIPTION OF THE DRAWINGS

FIG. 16 illustrates a block diagram of a device which can be used to implement, at least in-part, some of the various embodiments disclosed herein.

FIG. 17 shows a flow diagram of an example embodiment of a method of estimating diffraction of sound waves that travel from a first point to a second point in an environment that includes one or more objects, according to the disclosed technology.

DETAILED DESCRIPTION

Figure 1B:
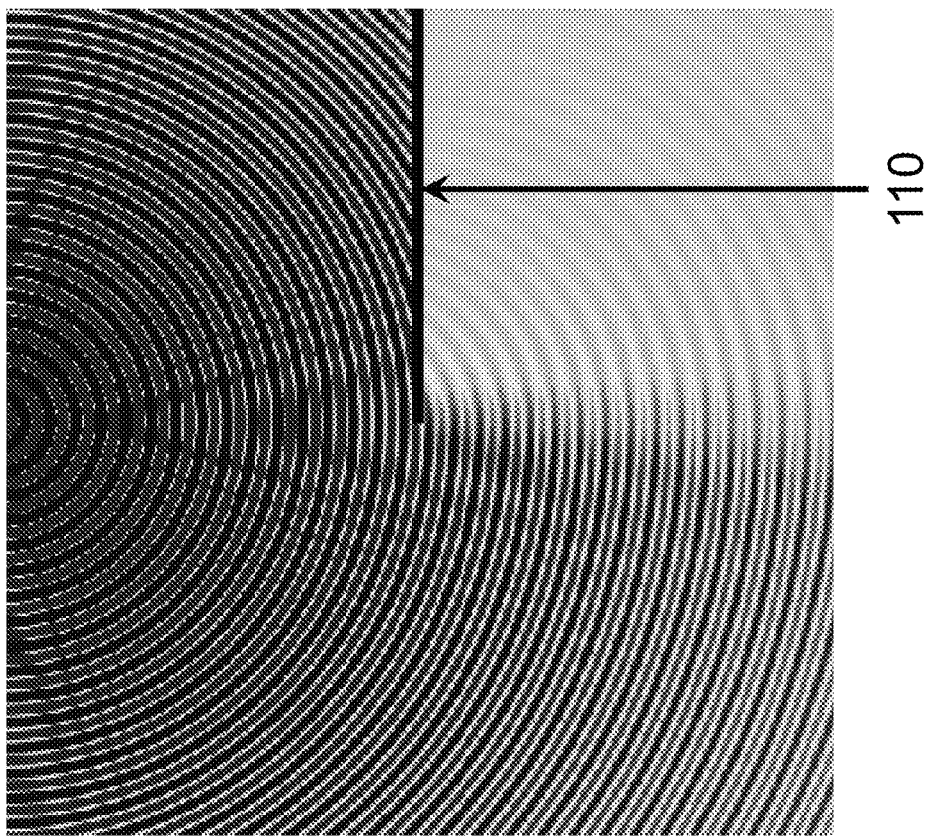
FIGS. 1A and 1B show a real part of a soundfield determined, according to an example embodiment, to illustrate diffraction around a large planar occluder at ~600 Hz and ~2850 Hz, respectively.

Determining the behavior of sound waves when encountering physical objects has important applications that include improved designs for auditoriums, movie theatres, sound studios and more generally enclosures or environments with particular acoustic characteristics, as well as for designing sound sources that are suitable for particular environments. When passing through openings or traveling around barriers in their path, sound waves undergo diffraction that results in a change in direction of waves. The amount of diffraction (the sharpness of the bending) increases with increasing wavelength and decreases with decreasing wavelength. Characterization of sound wave propagation in environments that include multiple structural details (e.g., walls, objects, openings, etc.) can be computationally expensive, particularly when computations must take place in real time, such as those needed in virtual environments with applications in virtual reality (VR) or augmented reality (AR) devices.

Among popular acoustic diffraction techniques for determination of sound wave propagation, the Biot-Tolstoy-Medwin (BTM) edge diffraction technique is the most accurate, but it suffers from high computational complexity and hence is difficult to apply in real time. Devices and methods according to the present disclosure use an alternative ray-based approach to approximating diffraction, referred to as Volumetric Diffraction and Transmission (VDaT) in this patent document. VDaT is a volumetric diffraction technique (also referred to as a method or a methodology in this patent document), meaning it performs spatial sampling of paths along which sound can traverse the scene around obstacles. In some implementations, VDaT uses the spatial sampling results to estimate the BTM edge-diffraction amplitude response and path length, with a much lower computational cost than computing BTM directly. On average, VDaT matches BTM results within 1-3 dB over a wide range of size scales and frequencies in basic cases, and VDaT can handle small objects and gaps better than comparable state-of-the-art real-time diffraction implementations.

Implementations of VDaT, such as GPU-parallelized implementations, are capable of estimating diffraction on thousands of direct and specular reflection path segments in small-to-medium-size scenes, within strict real-time constraints and without any precomputed scene information. Accordingly, methods and devices according to the disclosed technology provide significant improvements compared to the existing methods of determining sound propagation in terms of computational efficiency and accuracy of estimated acoustic effects such as acoustic diffraction. When implemented in virtual reality (VR) or augmented reality (AR) equipment, such as, e.g., VR or AR headsets or glasses, the disclosed embodiments can lead to substantial improvements in operation of that equipment, enabling sound generation for VR or AR environments with improved computational efficiency (and thus lower power consumption) while producing high quality sound.

Diffraction of sound is a readily perceptible phenomenon in any environment that includes objects that can occlude sound. As such, it is a key element of any acoustical computation. Diffraction can be determined more or less exactly through a large-scale wavefield based representation of sound propagation in the acoustical space. However, since human perception of sound spans roughly 10 octaves, and the shortest wavelengths of interest (about 2 cm) are orders of magnitude smaller than the scale of typical environments (2-20 m or possibly more), wavefield based approaches require a very large number of points and therefore a vast amount of computing power. As a result, these methods are typically unsuitable for real-time applications.

In geometrical acoustics (GA), the propagation of sound can be implemented using ray tracing techniques, and effects such as reflection and diffraction can be determined through transformation of these rays. GA methods are efficient and have been used in real-time audio systems for decades, from experimental systems in the 1990s to major commercial software packages today. The two most popular GA-based diffraction techniques (also referred to as methods or methodologies herein) are the Uniform Theory of Diffraction (UTD) and the Biot-Tolstoy-Medwin technique (BTM).

UTD is derived from the leading terms of an expansion of the wavefield result for an infinite wedge; it is reasonably fast to compute for each diffraction path, and it can be evaluated at a coarse set of frequencies to approximate the amplitude response with reduced computation. However, it has some error at low frequencies when the source or receiver are close to the edge, and even more error is introduced when it is used on practical scenes with small edges, violating its assumption of infinite edges.

BTM handles finite edges correctly. It has been shown to satisfy the wave equation for the infinite wedge, and it is conjectured to do so for all scenes if diffraction is determined to infinite order. While computation of the discrete-time impulse response for BTM involves finite sample rates and numerical integration, the sample rate and integration quality can be raised arbitrarily to (presumably) approximate the wavefield result as closely as desired. However, due to the numerical integration, BTM suffers from high computational complexity even with the minimum parameter settings, so its utility in real-time applications has been limited to small-scale examples.

Figure 1A:
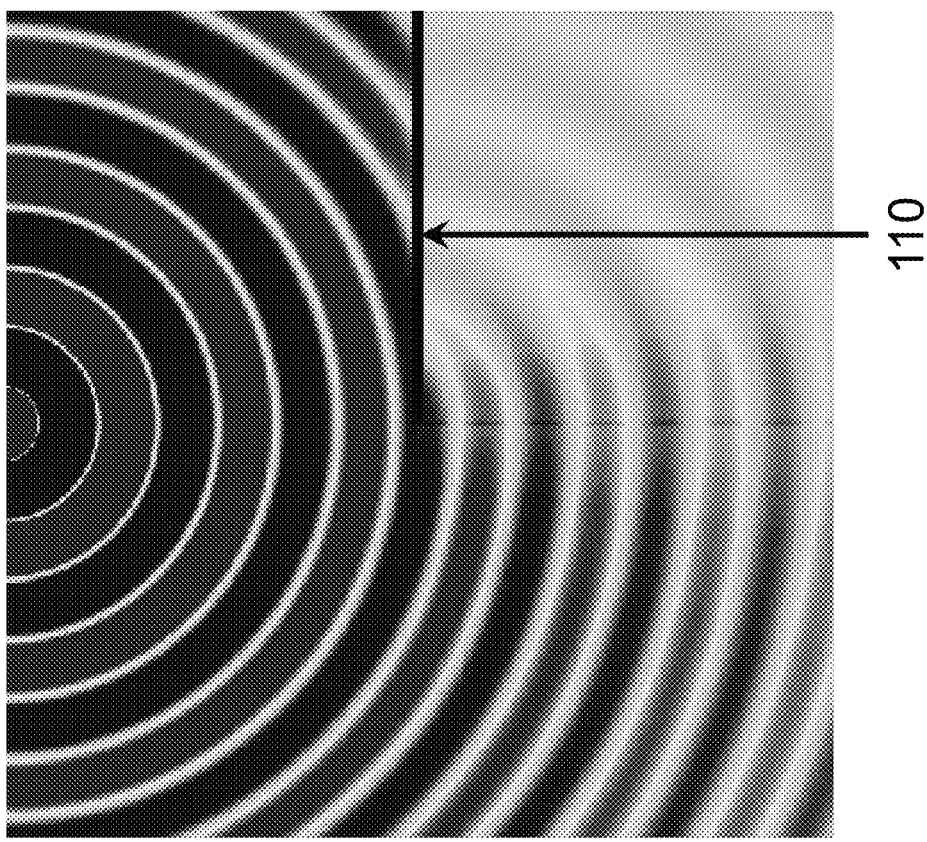

FIGS. 1A and 1B show a real part of the soundfield computed using a VDaT-based method according to an example embodiment. These figures illustrate diffraction around a large planar occluder (black line 110) at ~600 Hz and ~2850 Hz, respectively. For clarity, reflections from the occluder are disabled. Note how the diffracted waves emanate from the diffracting edge, despite the VDaT-based method involving neither waves nor edges.

Both UTD and BTM are edge diffraction methods that determine the filtering of sound on a path that goes around one or more edges of objects in the scene. Exhaustively considering all sets of edges for diffraction has polynomial complexity in the number of edges:

$$C_{edge} \propto \sum_{o=1}^{N_O} [s \cdot \eta^o \cdot ((o+1)I(t) + C_D(o))], \quad (1)$$

where $N_o$ is the maximum order, s is the number of source-receiver pairs (assuming no reflections), $\eta$ is the number of edges [typically about (⅔) t], t is the number of triangles, I(t) is the cost of determining whether a given segment intersects any triangle in the scene or not [P(t), using hierarchical structures O(log t) or better], and $C_D(o)$ is the cost of the o-order diffraction computation itself. Assuming that higher-order diffraction has the same computational cost as repeated first-order diffraction, and dropping smaller terms, the complexity is at least $$C_{edge}^{approx} > s \cdot t^{N_o} \cdot N_o \cdot (\log t + C_D(N_o)). \qquad (2)$$

As a result, this approach cannot be used in real-time computations for scenes of considerable complexity. Some approaches to circumventing this complexity include pre-computing edge visibility information, which restricts live changes to the scene, and Monte Carlo sampling techniques, which raise questions about consistency of quality. Methods according to the present disclosure are suitable for fully dynamic, real-time scenes, while being as accurate as possible over the wide range of scenes that are likely to be encountered in interactive multimedia applications.

Methods and devices according to the present disclosure use a volumetric diffraction technique which is a ray-based sampling of the empty space around obstacles, relative to the occluded direct path or path segment through the obstacles. Such approach is different from the edge diffraction methodologies mentioned above and has significant advantages: its computational complexity is largely decoupled from the scene complexity; it can account for non-shadowed diffraction, where the direct path is not occluded, with little additional cost; and it natively incorporates sound transmission through obstacles, including on higher-order reflection and diffraction path segments.

A nontrivial aspect of this volumetric sampling approach relates to creating a reasonably accurate diffraction amplitude response and path length results over a wide range of scene configurations. Leveraging theoretical relationships, combined with numerical analysis, and heuristic experimentation, we have developed a volumetric diffraction methodology (VDaT), which, in terms of the results, approximates those produced by the BTM technique but has a much lower computational complexity. In typical scene configurations, there is a small reduction in accuracy, as a trade-off for the large reduction in computation complexity. Furthermore, like BTM, VDaT does not exhibit the errors of UTD for small edge lengths, and in certain cases VDaT can produce results that are objectively superior to those of comparable real-time implementations of UTD or BTM. Thus, the disclosed methods of approximating diffraction of sound waves which are based on the VDaT technique have substantial advantages over the existing techniques in many real-time applications.

Approaches to reducing complexity of edge diffraction techniques may include pre-computing edge visibility and/or computing diffraction separately from reflections. According to some approaches, information about which edges in the scene are visible to each other, i.e., not occluded by other objects, may be precomputed and stored in a graph structure. Traversing this graph at run time substantially reduces the number of sets of edges that need to be considered for higher-order diffraction. However, any precomputation on the scene requires the precomputed elements—the diffracting edges—to be in fixed relative positions at runtime. This problem can be partly avoided by separately computing edge visibility for objects that are internally static but may move relative to each other, such as buildings and vehicles; unfortunately, this approach omits any diffraction paths that would involve more than one of these objects. Also, diffraction paths can be processed separately from specular reflection paths, to reduce the number of path segments needing diffraction computation. Of course, not allowing reflection paths to experience diffraction means these reflection paths cut in and out as the scene elements move, often causing audible discontinuities in the output.

Approaches to reducing complexity of edge diffraction techniques may also include Monte Carlo beam tracing (also referred to as ray tracing). Rays through the scene may be traced from the receiver on Monte Carlo trajectories, and UTD edge diffraction may be computed around the triangles they intersect. This approach successfully decouples the computational complexity from the scene complexity, and allows determining diffraction on higher-order reflection paths. However, because Monte Carlo does not guarantee that important reflection or diffraction paths are found, there may be quality issues. This quality problem can be ameliorated by introducing a caching scheme, which allows the ray tracing complexity to be effectively amortized over many frames, improving the quality of long, slow-moving sounds in every frame. In some approaches, tracing adaptively subdivided frusta (polygonal convex conical beams) through the scene instead of individual rays can be performed. This approach retains the advantages of the above approach while eliminating the quality issues. However, the performance of the frusta-based approach is barely real-time on the simplest scenes, due to the higher complexity of the frustum computation.

Some of the approaches to reducing complexity of edge diffraction techniques may include culling low-amplitude diffraction paths. Diffraction paths that are likely to be low in amplitude and hence only make small contributions to the overall output may be culled. This approach appears to be successful at reducing the computational burden of tracking sound propagation along insignificant paths, but it does not reduce the complexity of generating the diffraction paths in the first place.

Some of the non-edge diffraction techniques are based on Fresnel zones. Fresnel zones are ellipsoidal, wavelength-dependent spatial volumes around the direct path that represent the region in which most of the sound at each frequency propagates. An example real-time diffraction computation system can rasterize the triangles of occluding objects from a camera behind the source, to approximate what portion of each Fresnel zone around the path segment is blocked. That system may also use Fresnel zones in reflection computations, and use a basic approximate diffraction attenuation factor for estimating environmental noise in large, outdoor scenes.

Non-edge diffraction techniques may also use neural networks. For example, a neural network may be trained to estimate filter parameters that approximate the edge-diffraction results for a basic occluding object. The results are reasonably accurate and are shown to be perceptually acceptable to listeners; however, it is not clear how this approach generalizes to arbitrary geometries.

Some of the non-edge diffraction techniques are based on uncertainty relation and include incorporating diffraction into purely ray-traced sound propagation, in which rays that pass by close to edges contribute to the diffraction total. This technique was extended to 3D and produced good results when compared to real measurements. However, due to the large number of Monte Carlo rays needed to achieve good accuracy, computation times were measured in minutes, not milliseconds.

Volumetric approaches to determining diffraction effects disclosed herein are based on the notion of characterizing diffraction by examining the empty space around obstacles, as opposed to examining the obstacles' edges. These approaches can be understood from the combination of a simple acoustical observation and an implementation consideration. The observation is as follows: consider any real-world situation where diffraction has a noticeable effect, such as listening to someone speak while walking around a corner. It is immediately apparent that the high frequencies are attenuated by the obstacle more quickly than the low frequencies when the obstacle begins to occlude the direct path. It is as if the obstacle acts as a low-pass filter, with the cutoff dependent on how far the obstacle has cut through the direct path. (In fact, some rudimentary approaches to real-time diffraction estimation simply apply a generic low-pass filter when the direct path is occluded.) Geometrically, it is as if the high-frequency sound mostly travels in a small region around the direct path, and thus is blocked more fully by a small amount of occlusion, whereas the low-frequency sound occupies a larger volume around the direct path and therefore requires more occlusion to be affected. The concept of Fresnel zones is one formalization of this notion; we take the notion in a different direction below.

Figure 2:
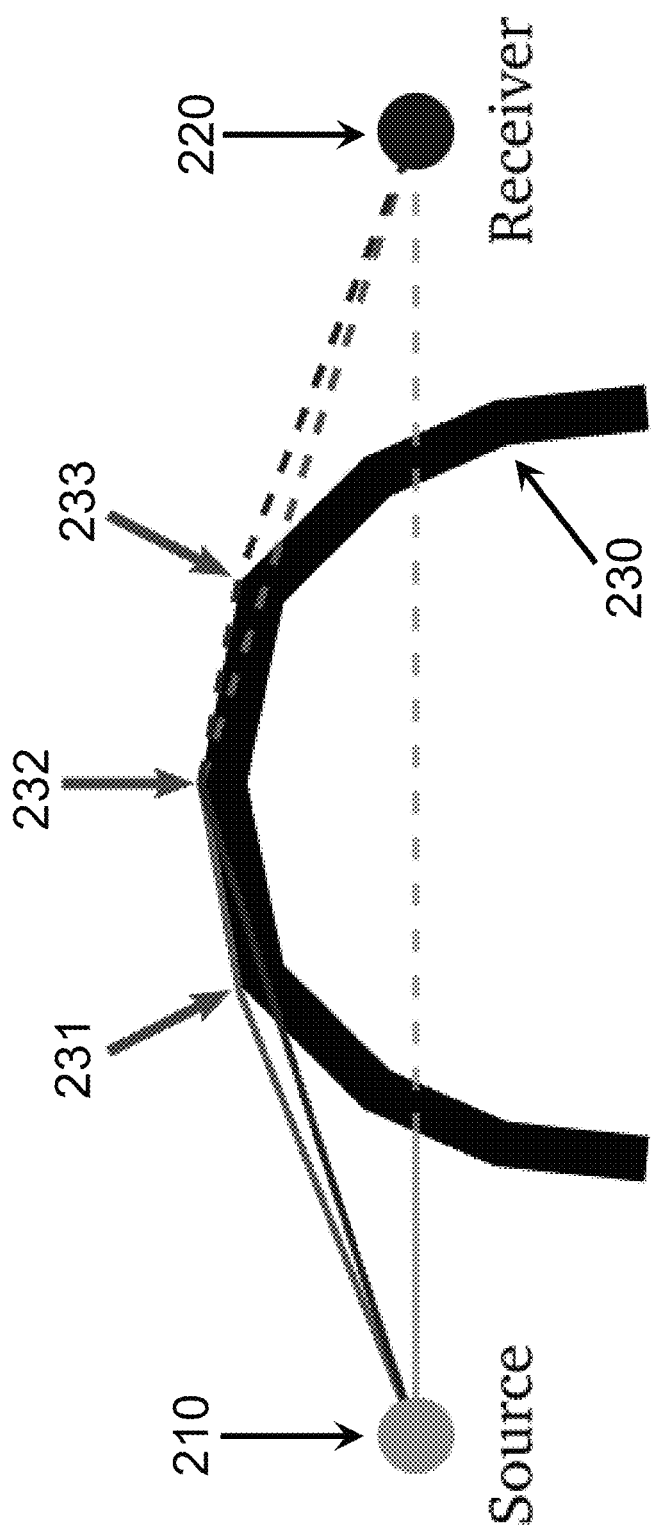
FIG. 2 illustrates sound diffraction on an example object during sound propagation between a sound source and a sound receiver.

Along with these observations, VDaT was also inspired by an implementation consideration: it is desirable, both computationally and theoretically, for the diffraction estimation to be decoupled from the amount of detail in the object meshes. On the one hand, the amount of mesh detail has a huge impact on the computational performance of an edge diffraction technique. Not only is the computational complexity polynomial in the number of edges for a given diffraction order, the diffraction order must be raised as the meshes become more complex. If the algorithm is not able to traverse around the outside of the obstacles in the limited steps available, important diffraction paths will be simply omitted, as illustrated in FIG. 2. FIG. 2 illustrates sound diffraction on an example object during sound propagation between a sound source 210 and a sound receiver 220. For the object 230 and positions of the sound source 210 and sound receiver 220, edge diffraction must be computed to at least third order on the edges 231, 232, and 233 of the object 230, or the diffraction path between the source 210 and the receiver 220 will be completely absent. If the object's curvature was approximated by more polygons, the edge diffraction order would have to be raised even further to avoid dropouts.

As 3D meshes become more detailed, the acoustical role of each edge typically diminishes, as most edges are contributing to the approximation of smooth surfaces or adding small-scale detail. Only when many edges are considered together does the acoustical behavior of the whole object emerge. This can still be determined using high-order edge diffraction, but it is no longer clear that the edges per se play a privileged role in determining the acoustical behavior of the object.

The volumetric diffraction approach disclosed herein leverages these considerations. At a high level, example VDaT operations can be described as follows:

Spatially sample the scene around the occluded direct path at many size scales, using ray tracing.

Use the results to estimate the predominant shape of the object meshes near the direct path.

Compute the diffraction amplitude response and path length, based on a VDaT approximation; this step can provide an approximation of how a rigorous computational methodology (such as BTM) typically behaves for the estimated objects.

It should be noted that in this document, the term VDaT is used for convenience to explain the various aspects of the disclosed volumetric diffraction methodologies, and is not intended to limit the scope of the disclosed embodiments. Referring to the above three operations, the spatial sampling is the only place VDaT interacts with the scene objects, and it does so in a highly efficient, parallelizable way. VDaT uses the spatial sampling results to approximate BTM edge-diffraction results, without needing any numerical integration as in BTM Note that while in our discussions below we typically use the example where the direct path is occluded, we can also apply VDaT to non-occluded paths, to incorporate non-shadowed edge diffraction. Also note that we can apply VDaT to every segment of every high-order specular reflection path.

Figure 3:
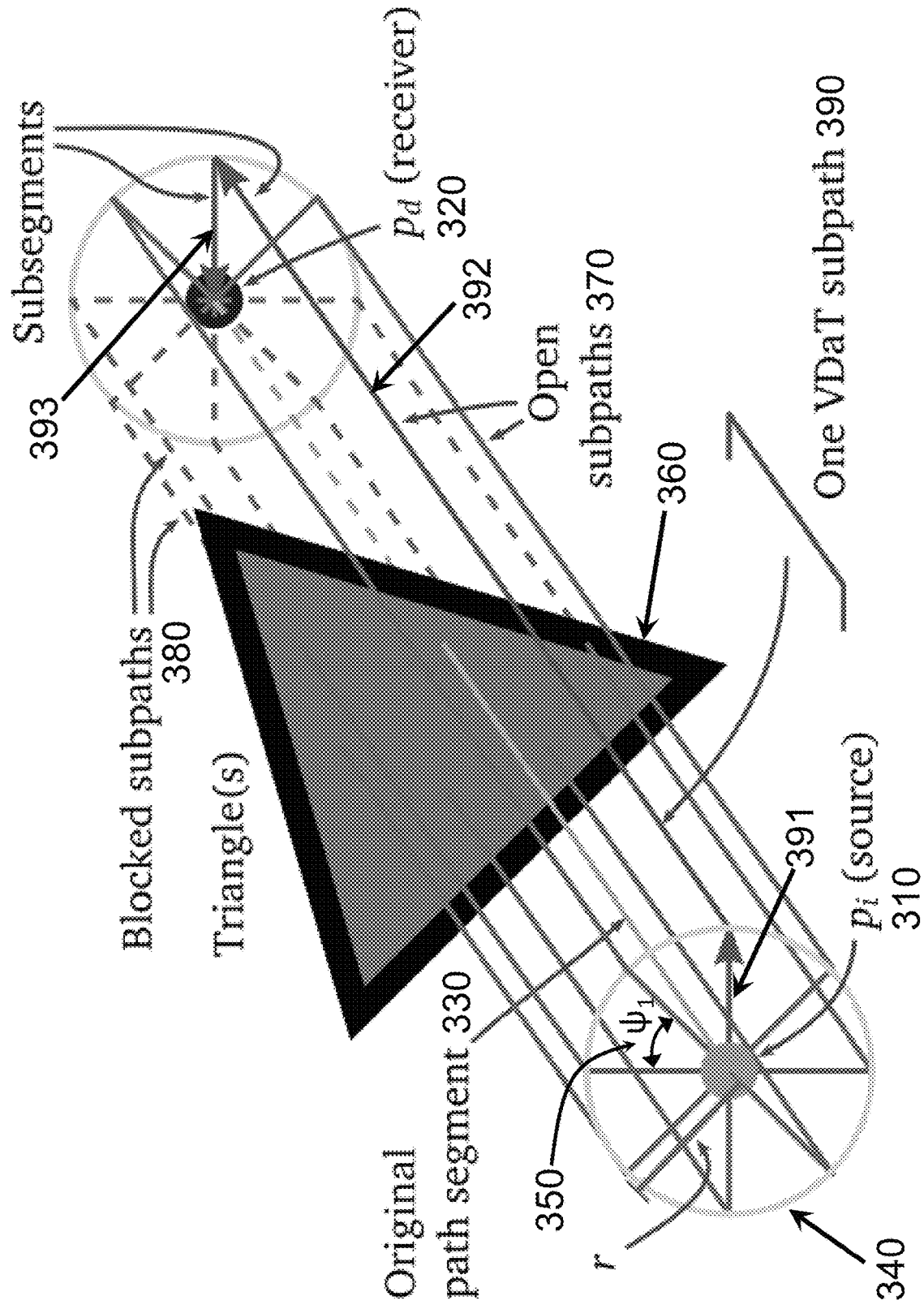
FIG. 3 illustrates some features of spatial sampling according to some example embodiments.

VDaT can sample the space around an original direct or specular reflection path segment, according to the following hierarchy illustrated in FIG. 3. FIG. 3 shows some of the features of VDaT spatial sampling according to some example embodiments.

Several "rings" (quantity $N_r$) are constructed around the original path segment 330 between a sound source 310 and a sound receiver 320, each with a different radius r. One of these rings, ring 340, is shown in FIG. 3.

For each ring, a number of angles $\psi$ (quantity $N_a$) are taken, spaced, e.g., uniformly in $[0,2\pi)$. Eight angles are shown in FIG. 3, including the angle $\psi_1$ (350 in FIG. 3).

At each angle, a number of "subpaths" (quantity $N_{sp}$) are constructed. Each subpath begins at one end of the original path segment and ends at the other end, representing a discretized approximation of a path sound could travel around obstacles such as, e.g., an object 360. Note that, in a computer model (e.g., a VR or AR one), an object may be represented by a set of polygons (e.g., triangles). The object 360 shown in FIG. 3 is represented by a single triangle. Only one subpath per angle is shown in FIG. 3; additional example subpaths are shown in FIG. 4.

Each subpath is composed of a number of "subsegments." In some implementations, each of the subsegments may be a section of a straight line. Each subpath shown in FIG. 3 has three subsegments. For example, a subpath 390 includes subsegments 391, 392, and 393. In some example embodiments, each subsegment is checked for intersection with all the triangles in the scene (or, in other example embodiments, with triangles that are within a certain distance from the original path segment), to determine whether the subpath it belongs to is blocked by obstacles or not. For example, as shown in FIG. 3, subpaths 370 are not blocked by any object while subpaths 380 are blocked by the object 360. Some of the subpaths may share subsegments for a reduction in computation, so $N_{ss}$ refers to the total number of unique subsegments traced per angle, across all the subpaths.

Figure 4:
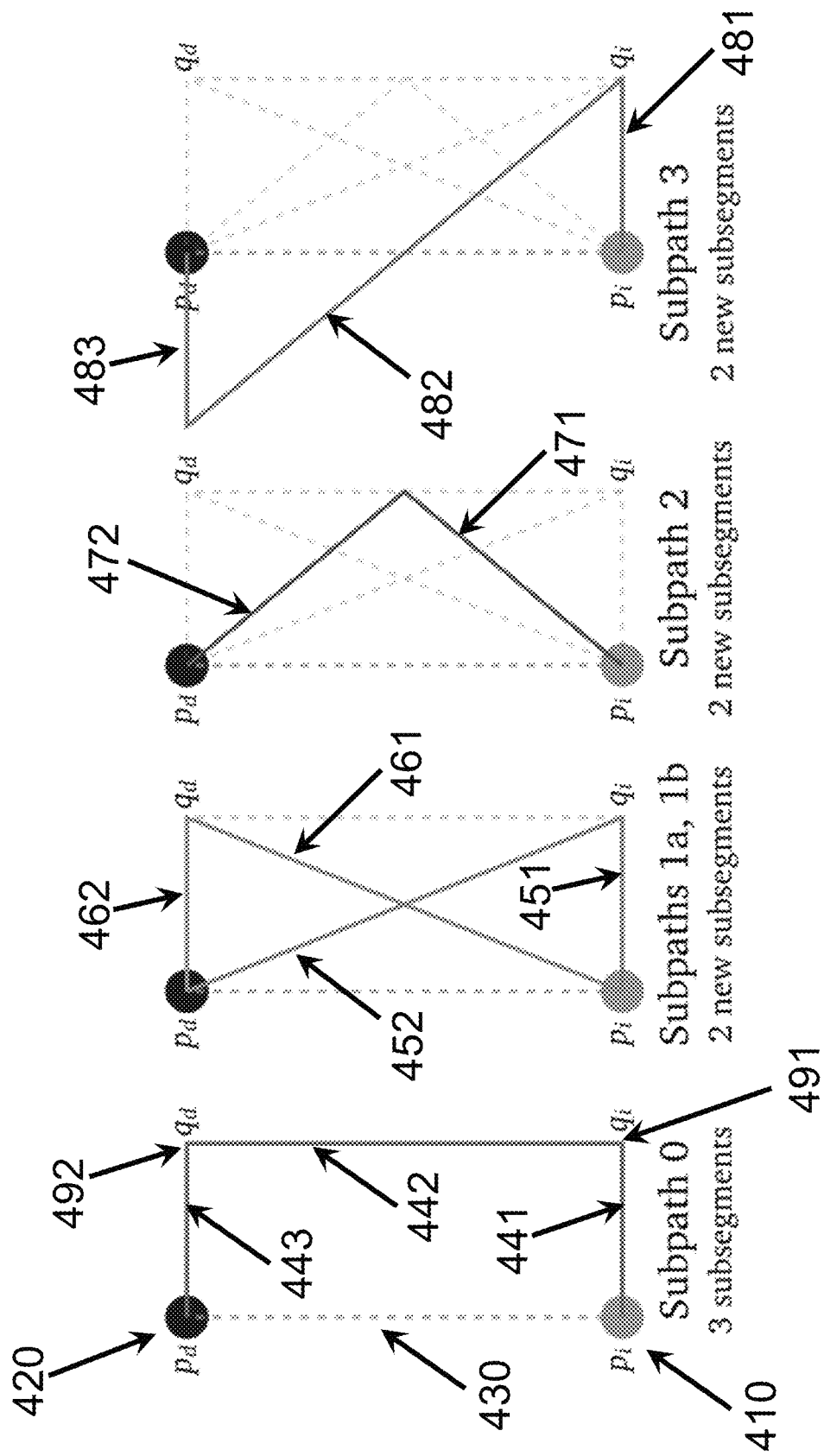
FIG. 4 shows example subpaths between a sound source and a sound receiver according to some example embodiments.

FIG. 4 shows example VDaT subpaths according to some example embodiments. The choice of subpaths can balance performance (subsegments can be reused in multiple subpaths) with robustness (more subpaths means more ways sound waves could traverse the scene around obstacles). FIG. 4 shows an original direct or specular reflection path segment 430 between points $p_i$ (410) and $p_d$ (420) referred to as a sound source 410 and a sound receiver 420. FIG. 4 further shows a subpath 0 between the sound source 410 and the sound receiver 420 which includes 3 subsegments: 441, 442, and 443. As shown in FIG. 4, each of the subsegments 441, 442, and 443 is a section of a $\psi$ mentioned above meaning that all segments of the subpath 0 lie in a plane such that an angle between that plane and another (reference) plane is equal to $\psi$. FIG. 4 further shows subpaths 1a, 1b, 2, and 3. All subpaths shown in FIG. 4 correspond to the radius r and angle ψ. That means that, for each of the subpaths 0, 1a, 1b, 2, and 3, a point of the subpath which is furthest from the original path segment 430 is at the distance r from the original path segment 430, and that all these subpaths are located in a common plane which has a certain rotation (ψ) relative to some reference plane. Subpath 1a includes subsegments 451 and 452 and adds one new subsegment (452) to the set of subsegments included into subpaths corresponding to the radius r and angle ψ. Subpath 1b includes subsegments 461 and 462 and adds one new subsegment (461) to the mentioned set of subsegments. Subpath 2 includes subsegments 471 and 472 which are not included into any other subpath shown in FIG. 4 and are, therefore, new to the set of subsegments. Subpath 3 includes subsegments 481, 482, and 483 of which the subsegments 482 and 483 are new. Note that the sets of subsegments which correspond to different radii r or different angles ψ may have some subsegments in common among them.

The equations describing the process of spatial sampling according to some example embodiments are as follows:

$$\Xi(r) = \frac{1}{N_a} \sum_{a=0}^{N_a-1} \Xi a\left(p_i, p_d, r, \frac{2\pi a}{N_a}\right) \quad (3)$$

$$\Xi a(p_i, p_d, \lambda, \psi) = \frac{1}{N_{sp}} \sum_{subpaths} \Xi_{sp}(p_i, q_i, q_d, p_d), \quad (4)$$

$$\Xi_{sp} = \prod_{subsegments} \Xi_{ss}, \quad (5)$$

where Ξ represents "transmission" ($\Xi_a$, $\Xi_{sp}$, and $\Xi_{ss}$ are the transmission for one angle, one subpath, and one subsegment, respectively), $p_i$ and $p_d$ are the two ends of the original path segment, and $q_i$ and $q_d$ are the outer points at each angle as indicated in FIG. 4. These latter two points are constructed as follows. Planes are constructed through $p_i$ and $P_d$ perpendicular to $\overline{p_i p_d}$. Orthonormal vectors $b_1$ and $b_2$ are constructed in these planes in a way that is consistent between frames and that changes smoothly when $p_i$ and $p_d$ are moved. The points u of the ring are constructed from these vectors, and if $p_i$ or $p_d$ are reflections, they are projected onto the reflecting triangles parallel to the original path segment:

$$b_1, b_2 \|b_1\|_2 = \|b_2\|_2 = 1, \{b_1 \perp b_2\} \perp \overline{p_i p_d}, \quad (6)$$

$$u(p, r, \psi) = p + b_1 r\cos(\psi) + b_2 r\sin(\psi) \quad (7)$$

$$q(p, r, \psi) = \begin{cases} proj_{t_p}^{\|\overline{p_i p_d}} & \text{if } p \text{ on triangle } t_p \\ u & \text{if } p \text{ source/receiver,} \end{cases} \quad (8)$$

$$q_i = q(p_i, r, \psi), q_d = q(p_d, r, \psi). \quad (9)$$

Note that as a type of spatial sampling, VDaT is bound to the sampling theorem: it can only consistently resolve physical features of similar or larger size than the sampling. However, the multiscale approach of VDaT ensures the scene is sampled more finely near the direct path, where small features have more acoustical impact. In other words, unlike UTD, VDaT has no trouble handling a scene with a 5-cm square object where the source and receiver are close to it on both sides. Meanwhile, unlike BTM, VDaT will completely ignore that small object when processing other path segments that are several meters away from the object.

$\Xi_{ss}=0$, and a subsegment that does not intersect any triangle has $\Xi_{ss}=1$.

VDaT supports optional sound transmission through obstacles. Triangles have transmission coefficients X(t)∈[0, 1], and the subsegment's transmission is the product of the transmission coefficients of each triangle the subsegment intersects:

$$\Xi_{ss}(a, b) = \prod_{t \in T_i(a,b)} X(t), \quad (10)$$

$$T_i = \{t \mid t \text{ intersects } \overline{ab}\}. \quad (11)$$

Before we introduce how VDaT approximates BTM, we discuss one point about the operation of BTM itself.

BTM is a "discrete Huygens"/"secondary source" technique: it determines diffraction as if there are an infinite number of secondary sources on the edge, which re-emit an impulse as soon as they receive it. In other words, there are an infinite number of diffraction paths around each edge. Each of these paths contributes one impulse to the overall impulse response, with different amplitudes due to the diffracting angles and different delays due to the path lengths. This implies that the filtering that is the hallmark of diffraction is actually a result of interference between these infinite diffracting paths around the edge. If all of these paths had the same length—for instance, in the case of a thin circular disk with the source and receiver on-axis—the impulse response would be a single scaled impulse, i.e., a flat frequency response, since all the impulses would arrive at exactly the same time. However, this case is a singularity. In most cases, the diffracting paths around the edge are of different lengths—in fact, the use of point sources and straight edges of finite triangles guarantees it. That is, in scenes composed of triangle-based meshes, diffraction filtering is caused by the existence of secondary-source diffraction paths with lengths ranging continuously within certain bounds. Methods according to some example embodiments are effectively using the spatial sampling to estimate those bounds and fill in the amplitude response based on specially-designed approximations of typical BTM behavior related to those bounds.

Figure 5:
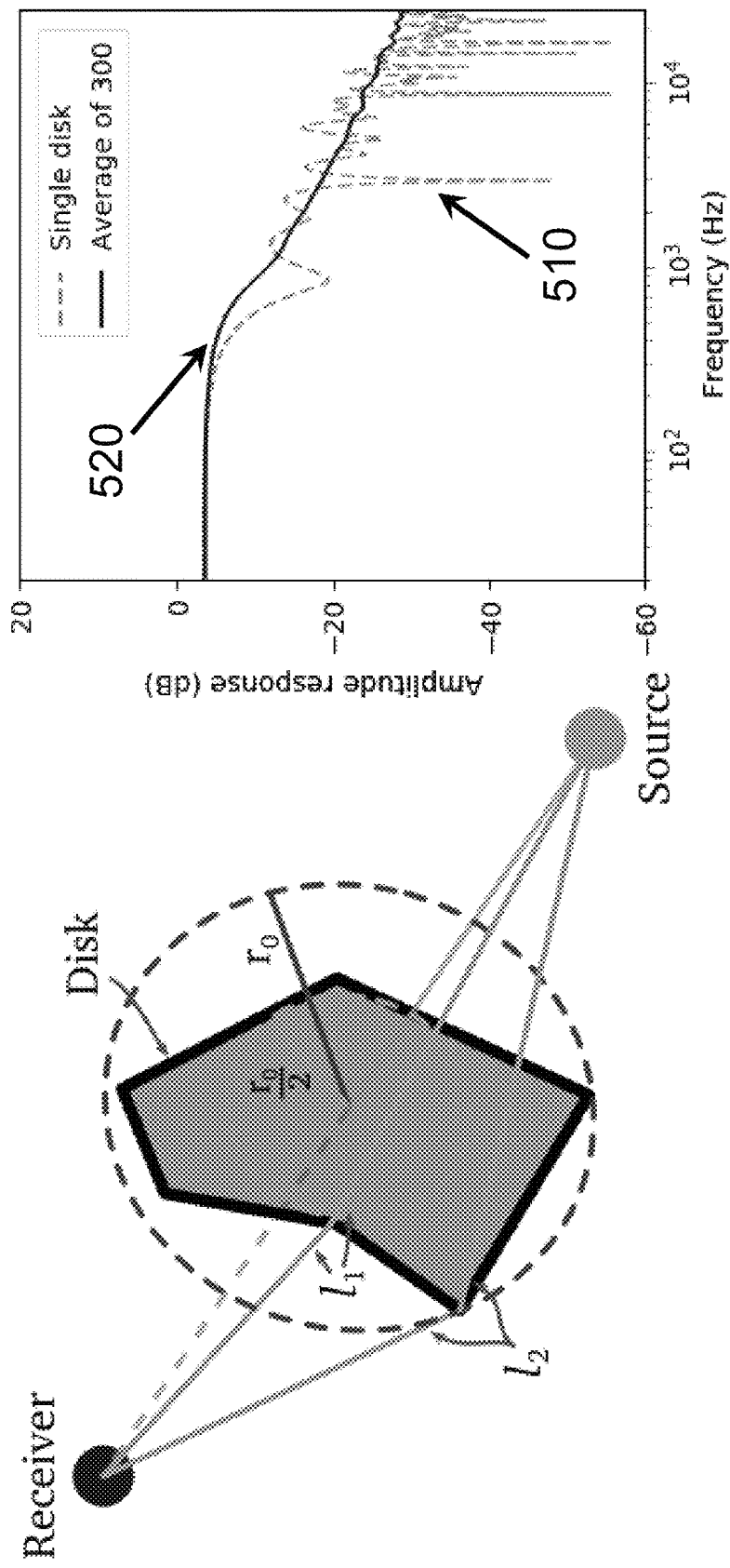
FIG. 5 shows a random disk with linear edges and corresponding amplitude responses determined according to an example embodiment.

Consider the case where $\Xi(r)=0$, $\forall r \leq r_0/2$ and $\Xi(r)=1$, $\forall r \geq r_0$. That is, we have performed spatial sampling at radii separated by, e.g., powers of two and found that all the subpaths were blocked up to a certain radius, but they are all open starting at the next largest radius. This means that there must be one or more obstacles in the scene, blocking the direct path, whose size is between those two radii. We do not know their exact shape, nor how close to the source or receiver they are, but we do know that they are no smaller than $r_0/2$ and no larger than $r_0$ (at least, we are sure of that if $N_a$ approaches infinity). If we project these obstacles onto a normal plane midway between the source and receiver, which corresponds to how subpath 0 (shown in FIG. 4) performs spatial sampling, they will become a disk with jagged, linear edges (FIG. 5, left). Crucially, the lengths of the BTM secondary source diffraction paths around these edges are bounded by $l_1$ and $l_2$, which are directly determined by $r_0$. We can construct hundreds of arbitrary jagged disks between $r_0/2$ and $r_0$, compute the true BTM amplitude response for each, and average them (FIG. 5, right). While each individual amplitude response displays severe interference effects due to the summing of the main BTM diffraction paths around the edges, their average is the familiar lowpass shape that we expect from diffraction around an obstacle. This filter is effectively constant up to a certain knee value k, and then has a rolloff of 10 dB/decade, corresponding to $a_2/a_1 = 1/\sqrt{f_2/f_1}$.

As mentioned above, performing spatial sampling using radii separated by, for example, powers of two (or powers of another numeric value) allows the scene to be sampled more finely near the direct path, where small features have more acoustical impact. Simultaneously, such sampling allows covering possible paths for the whole range of human-perceptible sound frequencies (e.g., between 20 Hz and 20 kHz which correspond to the sound wavelengths of about 17 m and 1.7 cm, respectively) using a limited number of size scales (each size scale corresponds to a radius r discussed above; the radius r may correspond to a sound wavelength $\lambda$ and the related sound frequency $v$). Such spatial sampling leads to a uniform sampling, on a logarithmic wavelength or frequency scale, of sound wavelengths or frequencies corresponding to the size scales.

FIG. 5 shows a random disk with linear edges, between the sizes $r_0/2$ and $r_0$ on the left and, on the right, FIG. 5 shows the BTM amplitude response of that particular disk (510 in FIG. 5), and the average amplitude response of 300 random disks constructed similarly (520 in FIG. 5).

Of course, the obstacles are unlikely to be such a disk shape positioned midway between the source and the receiver, as shown in FIG. 5. On average, they would be distributed (e.g., uniformly) along the length of the direct path. Thus, to effectively sample the other extreme of their possible distribution, we also project the obstacles onto a normal plane, which is 99% along the length of the direct path, right next to either the source or the receiver. (Both BTM and VDaT are symmetrical—the source and receiver can be swapped with identical results.) This results in changes to $l_1$ and $l_2$, as well as to the angle-dependent terms in BTM. However, the results differ only modestly; for example for $l_s=2$ m ($l_s$ is the distance between the sound source and the sound receiver) and $r_0=0.8$ m (FIG. 6), they differ by 1.7 dB FW-LSD [error metric given in Eq. (25)], as illustrated by the curves 610 (corresponds to the position of the obstacles halfway between the source and the receiver) and 620 (corresponds to the position of the obstacles closer to the source than to the receiver) in FIG. 6.

Figure 6:
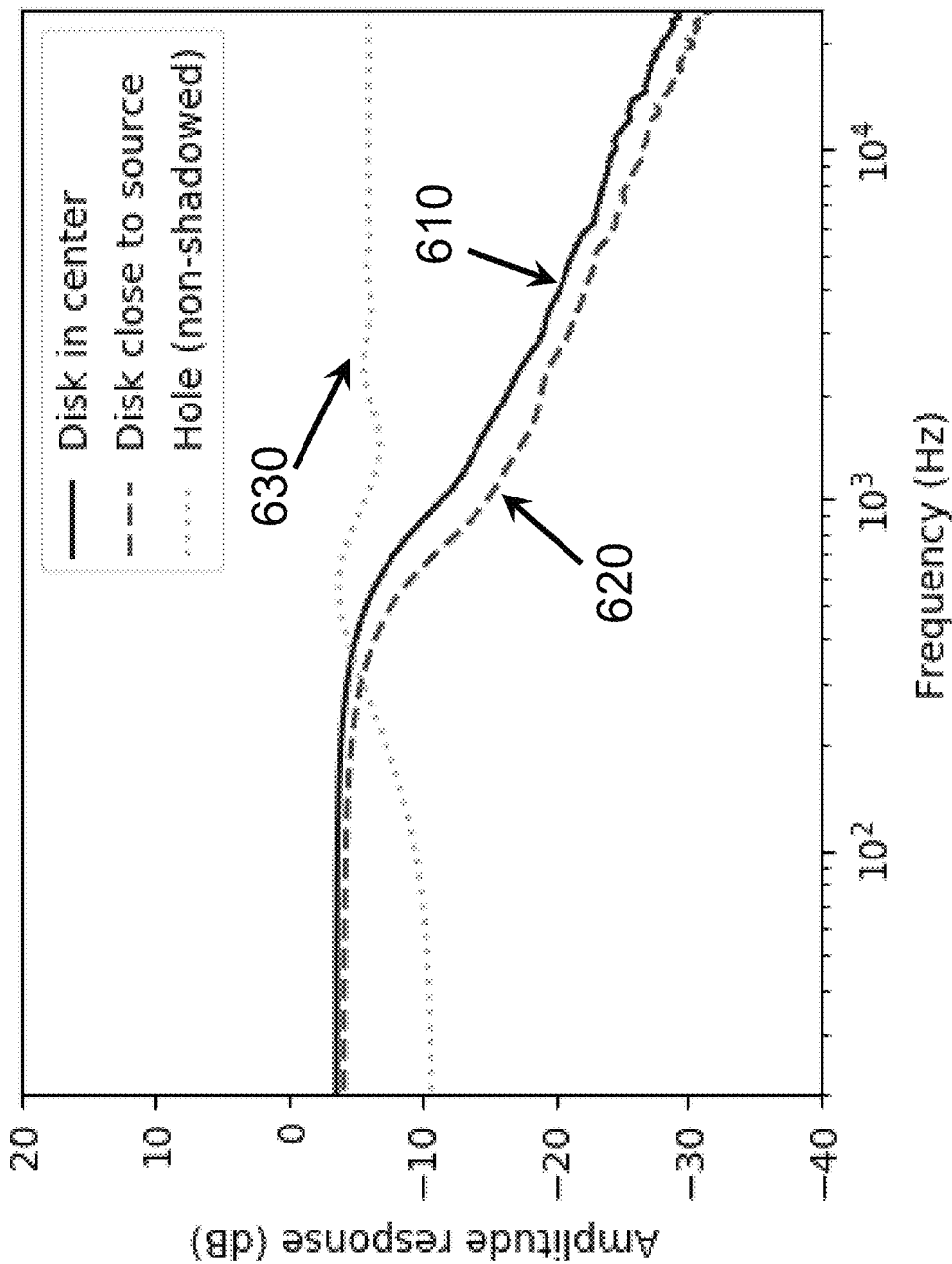
FIG. 6 shows example amplitude responses for three different configurations of sound-occluding obstacles.

FIG. 6 illustrates example amplitude responses for three different configurations of sound-occluding obstacles. There is one more case we consider at this stage: that of non-shadowed diffraction through a hole or gap between obstacles. This is the case where the spatial sampling results are the reverse of the above: fully open ($\Xi(r)=1$) at small radii ($\forall r \leq r_0/2$), and fully blocked above that ($\Xi(r)=0$, $\forall r \geq r_0$). To characterize such a case, we construct hundreds of jagged holes in infinite planes located, e.g., midway between the source and receiver, and compute and average the BTM amplitude responses to first order as above. In this case, the BTM results (e.g., curve 630 in FIG. 6; also, FIG. 7B) are that of an attenuating low shelving filter; the sloped section is now 20 dB/decade.

FIG. 6 shows average BTM amplitude responses over 300 random geometries in each of the three cases considered, for $l_s=2$ m and $r_0=0.8$ m.

Figure 7A:
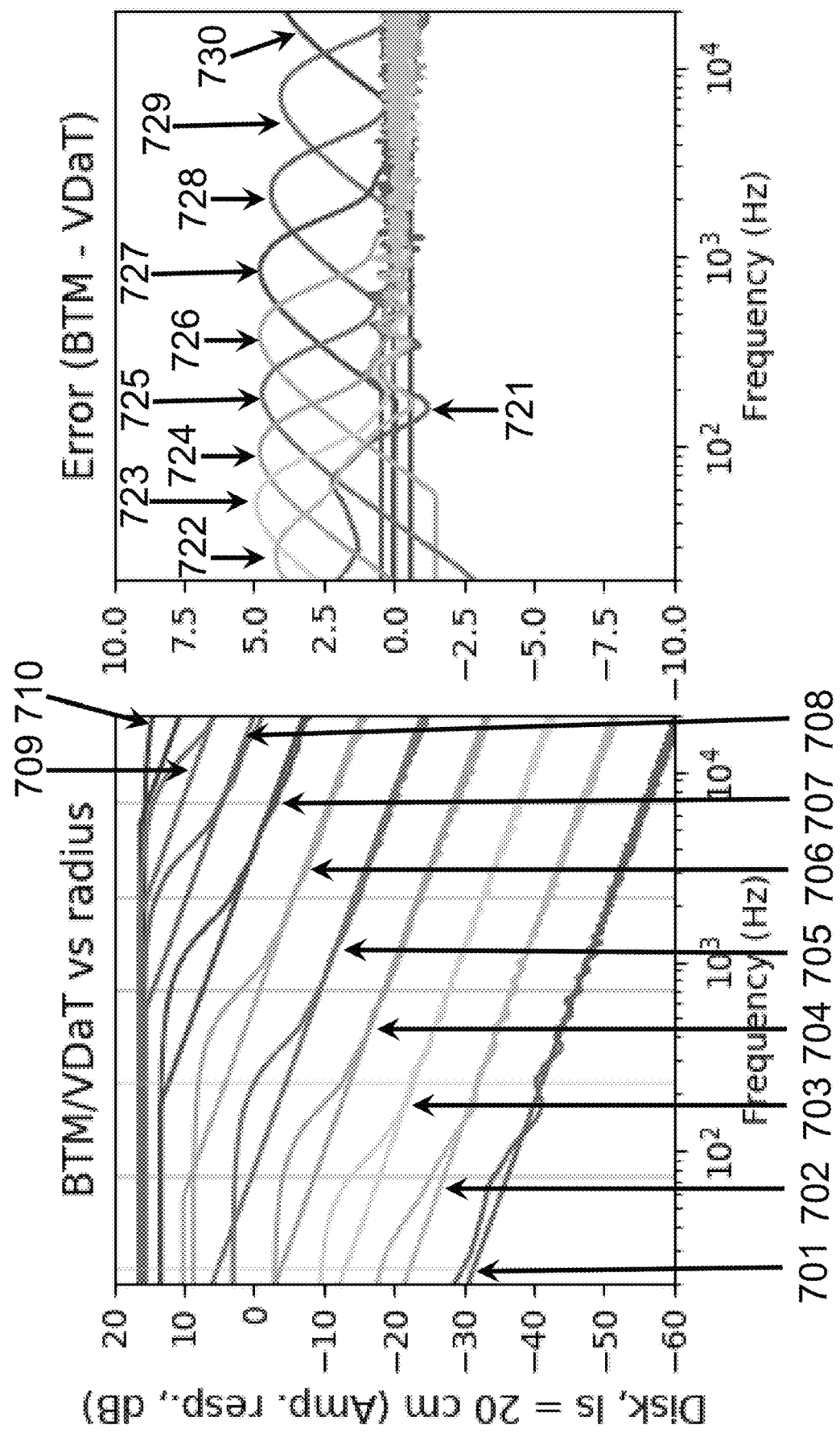
FIGS. 7A and 7B illustrate amplitude responses for two example cases of obstacle types which can be used to optimize parameters of a method according to an example embodiment.
Figure 7B:
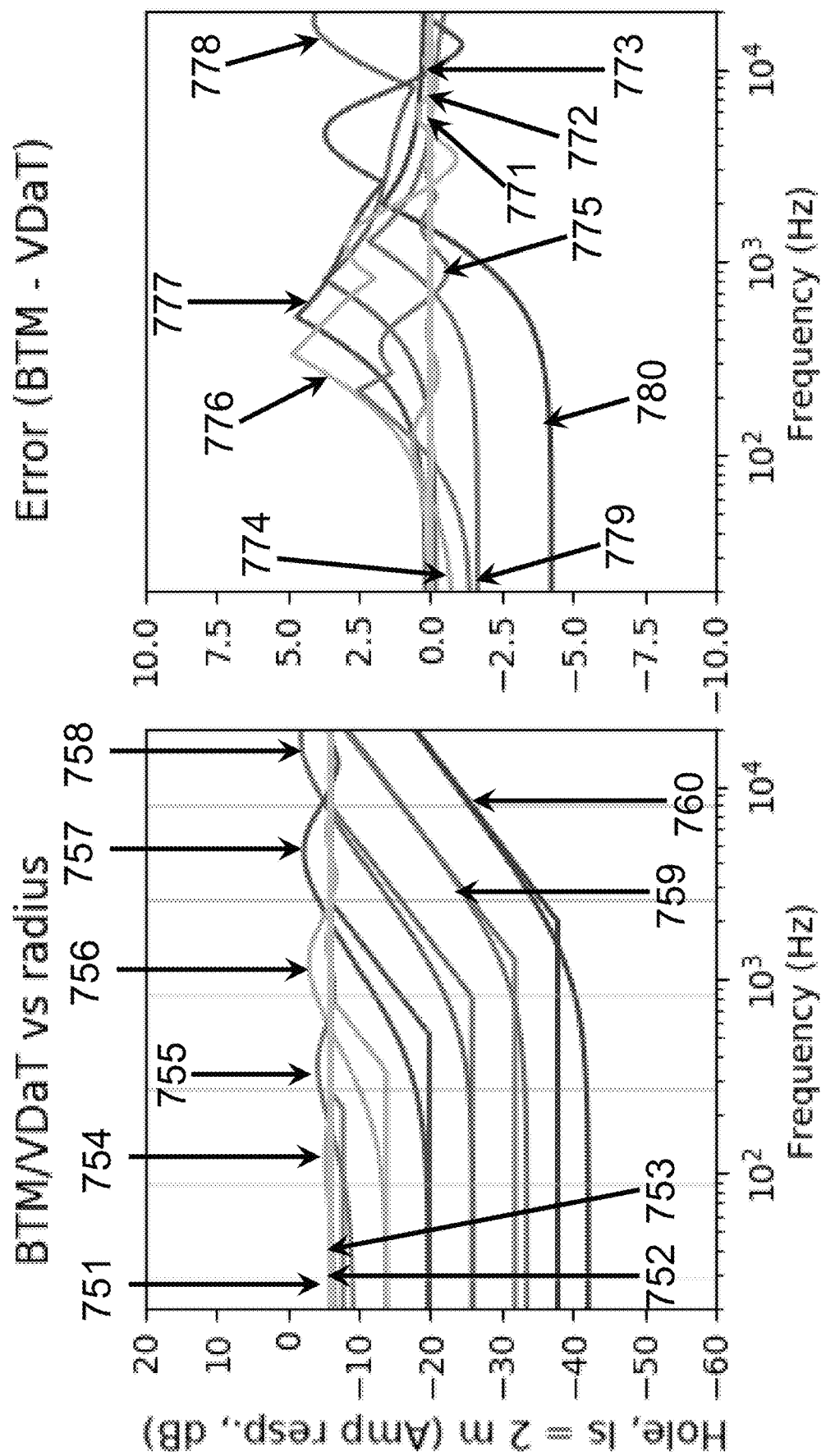

FIGS. 7A and 7B illustrate amplitude responses for two example cases of obstacle types used to optimize parameters of a method according to an example embodiment. FIGS. 7A and 7B show two of the nine cases used in the parameter optimization: disks with small $l_s$ (FIG. 7A), and holes with medium $l_s$ (FIG. 7B). In the left subplot in each of FIGS. 7A and 7B are the curved lines, which are BTM amplitude responses (averaged, for a given radius, over multiple realizations of the disk-shaped occluding object (see, e.g., FIG. 5) or the hole in an infinite plane), and the piecewise linear lines, which are the VDaT approximations of the respective BTM amplitude responses. The ten cases shown in each subplot in FIGS. 7A and 7B correspond to ten radii, from $r_0=16.384$ m to $r_0=3.2$ cm separated by powers of 2. The radii, from $r_0=16.384$ m to $r_0=3.2$ cm separated by powers of 2, correspond to curves 701-710, respectively, curves 721-730, respectively, curves 751-760, respectively, and curves 771-780, respectively. The light vertical lines in left subplots in FIGS. 7A and 7B are the values of k.

Since these averaged BTM amplitude responses depend on the length of the original path segment $\|\overline{P_1P_4}\|=l_s$, which may be any continuous value, it is not feasible to pre-compute and store them. We instead determine them [Eqs. (12)-(14)] using the shapes described above: a flat response and then a 10 dB/decade rolloff for the two disk cases, and two flat segments with a 20 dB/decade sloped section in between for the hole case:

$$D_{disk}(\omega) = a_d \min\left(1, \frac{1}{2\sqrt{\omega/k}}\right), \quad (12)$$

$$D_{hole}(\omega) = \max(\min(D_d \omega/k, D_d), a_h), \quad (13)$$

$$D_d + 1/l_s, \quad (14)$$

where $D_{disk}$ and $D_{hole}$ are diffraction amplitude responses in frequency $\omega$, and $D_d$ is the amplitude response for the original direct path segment with no diffraction. We observe that the knee for the two filter shapes in each case are in roughly the same location, so we use a single knee value k for both. The other two needed parameters are $a_d$, the low-frequency amplitude for the disk cases, and $a_h$, the low-frequency amplitude for the hole. According to some implementations, the three parameters $\{k, a_d, a_h\}$ are functions of the radius $r_0$ and $l_s$ which do not depend on the position of the obstacles between the source and receiver, as the spatial sampling does not provide that information. Of course, the BTM results do depend on that information; so, in some embodiments, we can estimate $\{k, a_d, a_h\}$ given $\{r_0, l_s\}$ that produces as little error as possible over the range of relevant conditions.

To approach this optimization problem, we began by plotting and observing the values of each of these parameters as $r_0$ and $l_s$ were varied, and attempting to write equations that matched their behavior. Once we had developed a general form for these equations, we created a parameter optimization system that uses a random walk to jointly fine-tune their parameters. We considered the three cases discussed above, each for three size scales ($l_s=\{20$ cm, 2 m, 20 m$\}$), and for ten radii spaced in powers of two from 16.384 m to 3.2 cm, to roughly cover the range of wavelengths of human hearing. The optimization objective was the $L_1$ distance between the averaged BTM amplitude response and the VDaT amplitude response, in the range 20 Hz-20 kHz. This process produced the following relations, where $\{k_1, \ldots, k_6, d_1, \ldots, d_5, h_1\}$ are the optimized parameters given in Table I:

$$\hat{k} = \exp_{10}(k_1(b_k - k_5)^{k_2} + k_3 b_k + k_4), \quad (15)$$

$$b_k = \log_{10} \frac{c(l_s/2)^{k_6}}{r_0}, \quad (16)$$

TABLE I

Numerically optimized parameter results for Eqs. (15)-(19).

| Param | Value |
|---|---|
| $k_1$ | 0.7735 |
| $k_2$ | 1.0446 |
| $k_3$ | 0.7991 |
| $k_4$ | -1.0501 |
| $k_5$ | 0.6817 |
| $k_6$ | 0.3453 |
| $d_1$ | 1.4430 |
| $d_2$ | 0.9190 |
| $d_3$ | -0.3280 |
| $d_4$ | 1.3076 |
| $d_5$ | -0.3378 |
| $h_1$ | 1.5829 |

$$\hat{a}_d = \frac{1 + (d_4 l_s/r_0)^{d_5}}{\sqrt{l_s^2 + r_0^2}} \left( d_2 + \frac{d_3}{x + 1/x} \right), \quad (17)$$

$$x = d_1 l_s/r_0, \quad (18)$$

and $$\hat{a}_h = \min\left( \frac{h_1 r_0}{l_s^2}, D_d \right). \quad (19)$$

From FIG. 7A, it is evident that much of the resulting error is due to the "bump" near the knee in the BTM amplitude response, which seems to be caused by the first side-lobe lining up at the same frequency over all realizations rather than being randomly distributed. Methods according to some example embodiments can incorporate this "bump" to further reduce the resulting errors.

We now consider how the estimated BTM amplitude responses above are combined for the general case of partial transmission on multiple rings. First, according to some example embodiments, we initialize the amplitude response to zero if the original direct path segment is blocked, or to the direct-path amplitude response if it is open:

$$D_0(\omega) = \begin{cases} D_d & \text{if } \Xi(0) = 1 \\ 0 & \text{otherwise.} \end{cases} \quad (20)$$

Next, we iterate over the rings and use the difference in transmission between the current ring and the next smallest ring as a weighting on the estimated BTM amplitude response between those two radii. This ensures the responses computed above are used without modification if the spatial sampling results are the special cases considered above and it provides an interpolation between the responses in all other cases. If the difference is negative, we use the "hole" amplitude response, as this corresponds to the larger ring being more blocked than the smaller ring.

$$D_i(\omega) = D_{i-1}(\omega) + (\Xi(r) - \Xi(r_{-1}))D_\Delta, \quad (21)$$

$$D_\Delta = \begin{cases} D_{disk}(\omega) & \text{if } \Xi(r_i) \geq \Xi(r_{i-1}) \\ D_d - D_{hole}(\omega) & \text{otherwise.} \end{cases} \quad (22)$$

In Equation (22), $D_{disk}(\omega)$ and $D_{hole}(\omega)$ correspond to the radius n. The results for the large occluder discussed below demonstrate the effectiveness of this accumulation/interpolation scheme.

Figure 8:
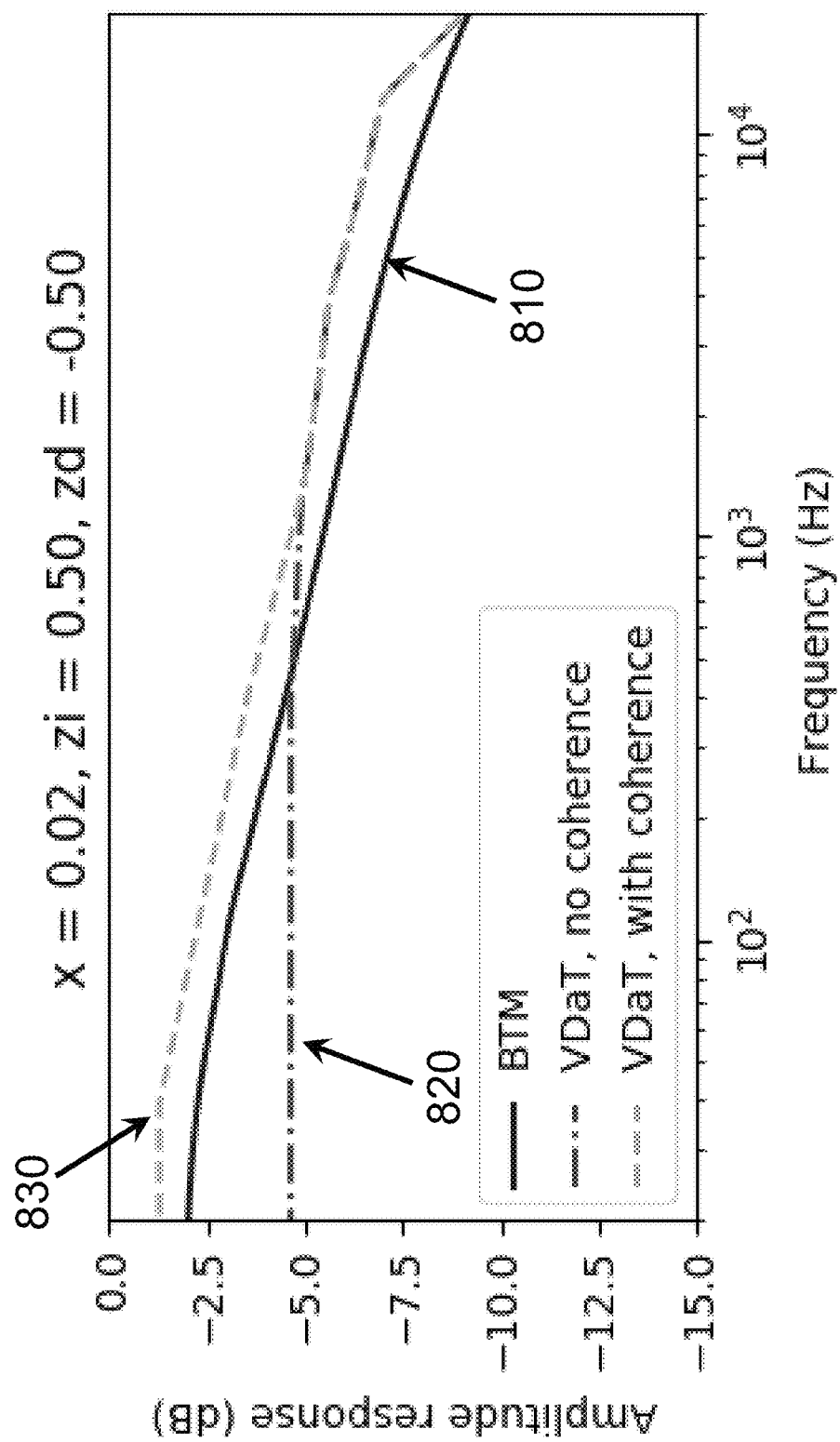
FIG. 8 shows example results obtained using a method according to an example embodiment.

Furthermore, we can apply one more heuristic to improve the results. Often, the set of angles that are blocked on consecutive rings are the same or similar, for instance when there is a large object occluding the direct path only slightly. We observed that in these cases, the BTM amplitude response has a higher value at low frequencies than expected (FIG. 8).

[$r_1$, $2r_1$]) are coherent with the low frequencies diffracting around the portions of the edge in the next range ([$2r_1$, $4r_1$])

$r_1$ and $r_1/2$, there is coherence if $|\Xi(r_1)-\Xi(r_1/2)|<1/N_a$, meaning that the number of angles blocked for each is the same. The frequencies corresponding to wavelengths of these radii are computed, $\omega_1=c/r_1$ and $2\omega_1$, respectively, to form a frequency band. In each frequency band that has coherence, the gain is interpolated down from $2^{1/N}$, at $\omega_1$ to 1 at $2\omega_1$, linearly in the log-log amplitude-frequency domain. The use of base-2 logarithms and power-of-2 radii allows this expression to be greatly simplified [Eq. (24)]. Note that $D_N$ is the result of combining $N_r$ rings from Eq. (21), and $D_{VDaT}$ is the final VDaT amplitude response:

$$D_{VDaT}(\omega) = D_{N_r} \prod_{\omega_1 \text{coher.}} \kappa(\omega_1), \quad (23)$$

$$\kappa(\omega_1) = \left( 1, \left( \frac{2\omega_1}{\omega} \right)^{1/N_r}, 2^{1/N_r} \right) \quad (24)$$

FIG. 8 shows example VDaT results with and without the "coherence" heuristic described above. Curve 810 in FIG. 8 corresponds to the amplitude response obtained, for an occluding obstacle, using BTM. Curve 820 in FIG. 8 corresponds to the amplitude response obtained, for the occluding obstacle, using VDaT without using the coherence heuristic, and curve 830 in FIG. 8 corresponds to the amplitude response obtained using VDaT with the coherence heuristic.

In addition to amplitude response estimation, any approach to diffraction estimation must estimate the delay of the diffracted sound, which is represented by the diffraction path length. According to some example implementations in which VDaT does not compute edge diffraction paths, VDaT can modify the path length of the original direct path segment if it is occluded. In simple cases with only one edge diffraction path, VDaT can produce path length results that roughly match those produced by the existing diffraction estimation techniques over a wide range of positions (FIG. 10), as will be discussed below. In more complicated scenes, in which the existing techniques would produce many diffraction paths, VDaT can estimate the shortest secondary-source edge diffraction path through the scene to represent the first arrival of sound.

Figure 9:
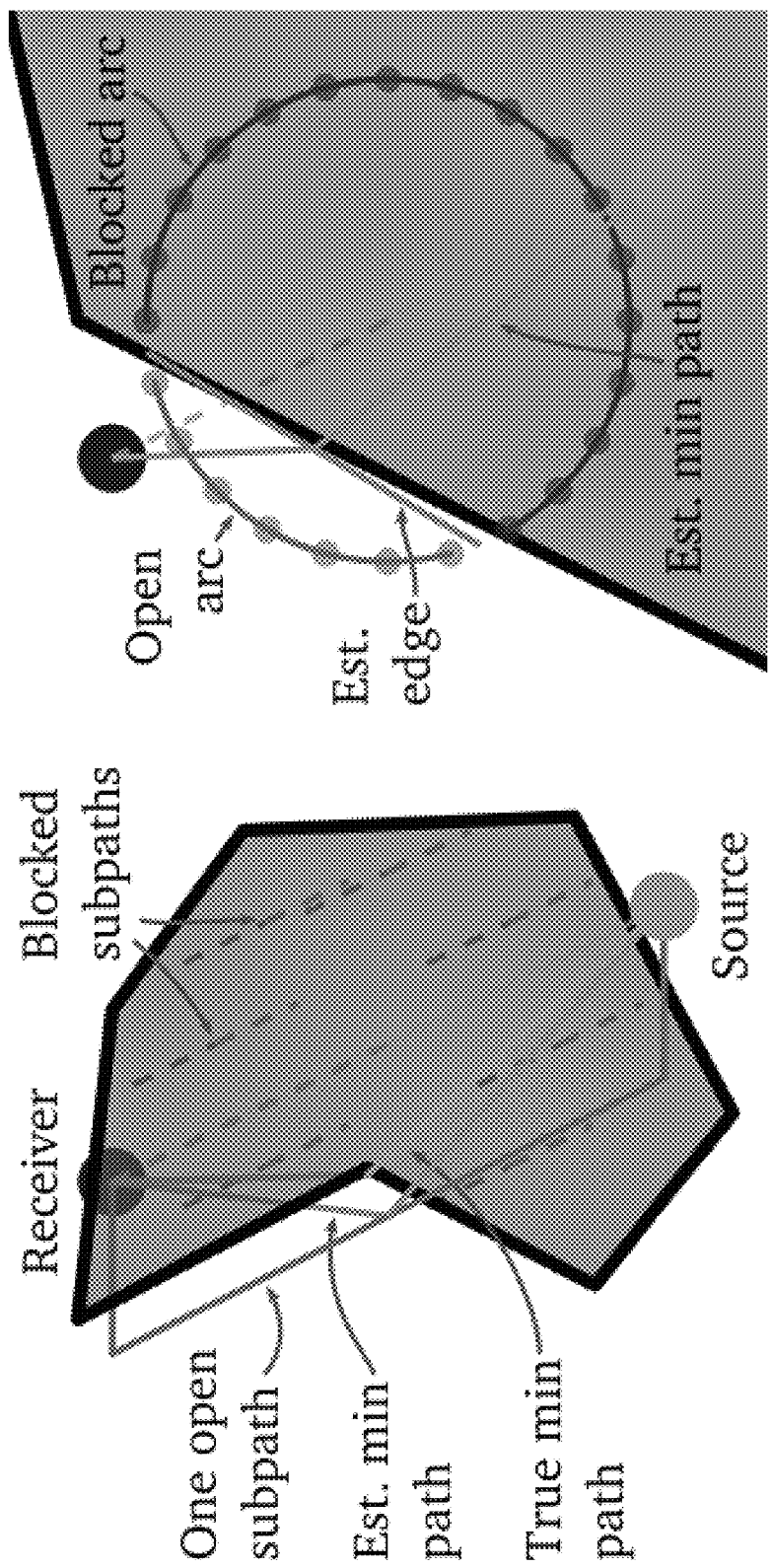
FIG. 9 illustrates estimating the minimum edge diffraction path length from a single unblocked subpath (left) or a range of consecutive unblocked subpaths (right), according to some example embodiments.

FIG. 9 illustrates estimating the minimum edge diffraction path length from a single unblocked subpath (left) or a range of consecutive unblocked subpaths (right), according to some example embodiments.

Each VDaT subpath that is unblocked represents a way, albeit an angular one, that sound can get through the scene from the source to the receiver. Since unblocked subpaths are effectively coarse overestimates of the true shortest secondary-source diffraction path, the shortest unblocked subpaths—i.e., at the minimum radius-will provide the most accurate information. For example, if only one single subpath is unblocked on the smallest ring $r_1$ that has any unblocked subpaths, that subpath is very likely to traverse the scene near the true shortest secondary-source edge diffraction path. The length of the true path can be estimated from the subpath (FIG. 9, left). If using subpath 0 (see FIG. 4), an assumption must be made about where the occluder is along the direct path segment, but the worst-case error—when the occluder is assumed in the middle of the direct path segment, while it is actually at one end, and when $l_s=2r_1$—is only 14.4%. For other geometries, the error is lower, and the use of multiple subpaths can impose tighter bounds on the length estimate, reducing the error further.

Figure 10:
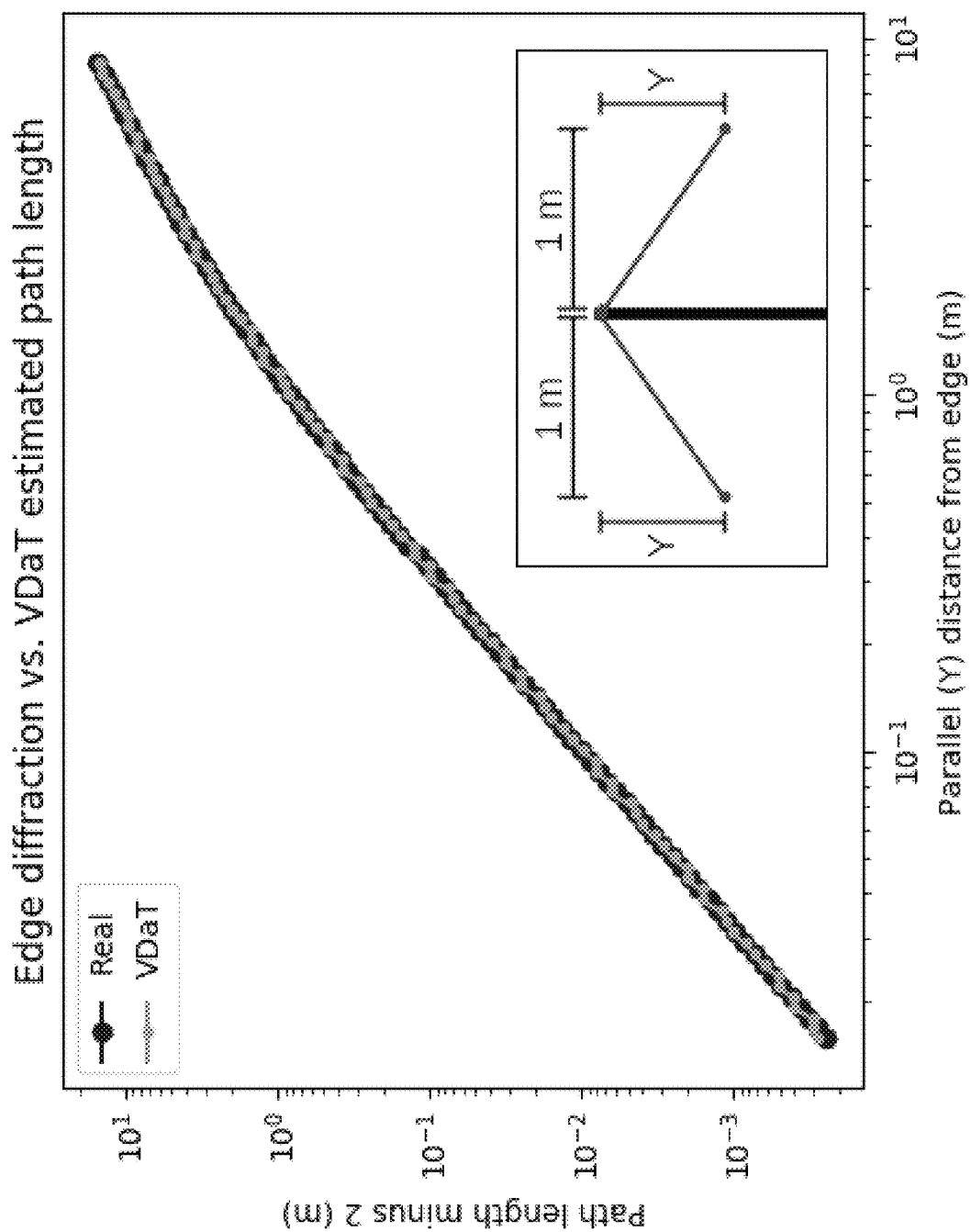
FIG. 10 shows edge diffraction path lengths determined, using different methods, for an example occluding object.

When there are multiple individual unblocked subpaths at isolated angles on a given ring, there is no additional information beyond the case of a single subpath above. However, when there are unblocked subpaths at consecutive angles, this implies the edges of the obstacles are somewhere inside the ring in that region. Assuming that the edges of the obstacles are straight on average, we connect the ends of the unblocked arc with a straight line and estimate that the shortest edge diffraction path goes around the center of this line (FIG. 9, right). When this assumption of straight edges is correct, such as for convex objects whose edge lengths are $\geq r_1$, this approach is quite accurate (FIG. 10). When it is not, such as for concave objects in particular orientations, the error can be larger, but it is bounded by the estimated length around the next smallest ring.

FIG. 10 shows BTM edge diffraction path length vs. VDaT path length estimates, for the symmetrical case, over a wide range of distances to the edge.

The VDaT path length estimation system is essential to accurately determine delay and phase in static cases such as sound field intensity plots and room impulse responses. Because its estimates change discretely as subpaths are blocked or unblocked, diffraction path length estimation may be disabled in dynamic scenes or may be smoothed overtime. In some example embodiments, VDaT may use the original direct path segment as the direction from which diffracted sound arrives to the listener as this typically does not introduce much inaccuracy in various applications. According to other example embodiments, VDaT may determine the true direction from which diffracted sound arrives to the listener. For a small obstacle, there are typically multiple edge-diffraction paths of similar lengths around the obstacle, so the sum of them is usually perceived as sound coming from behind the obstacle. Conversely, large objects such as room walls often have a non-negligible transmission component, and due to the precedence effect, the perception of direction is usually dominated by the sound with the shortest path delay (which is the transmitted sound).

The results in this section are from a set of Python scripts that use VDaT, BTM, and other approaches to estimate diffraction effects for definable 2D and 3D scenes. In all examples below, VDaT uses nine rings, 64 angles, and subpath 0 only ($N_r=9$, $N_a=64$, $N_{sp}=1$, $N_{ss}=3$). Our error metric is frequency-weighted log spectral distance (FW-LSD) [Eq. (25)] in the 20 Hz-20 kHz range, as compared to the BTM amplitude response. This metric ensures that error is weighted the same over each octave, rather than over linear frequency as in standard LSD:

$$FW-LSD(a_1(\omega), a_2(\omega)) = \sqrt{\frac{\sum_\omega \frac{\left(20\log_{10}\frac{a_1(\omega)}{a_2(\omega)}\right)^2}{\omega}}{\sum_\omega \frac{1}{\omega}}}. \quad (25)$$

Figure 11:
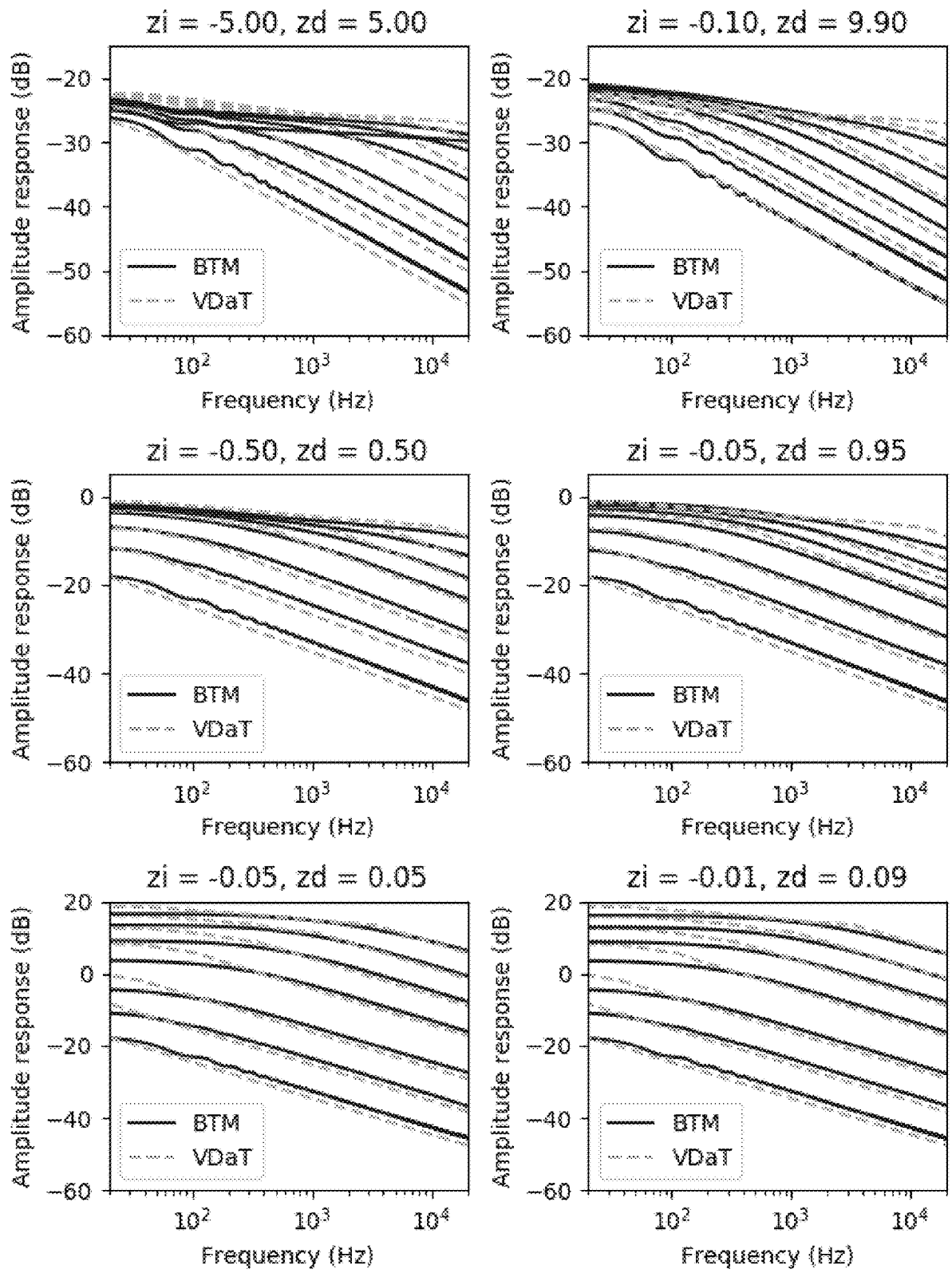
FIGS. 11 and 12 show amplitude responses computed using different methods for normal and non-shadowed diffraction for different values of the direct path length and distance from the diffracting edge to the direct path.
Figure 12:
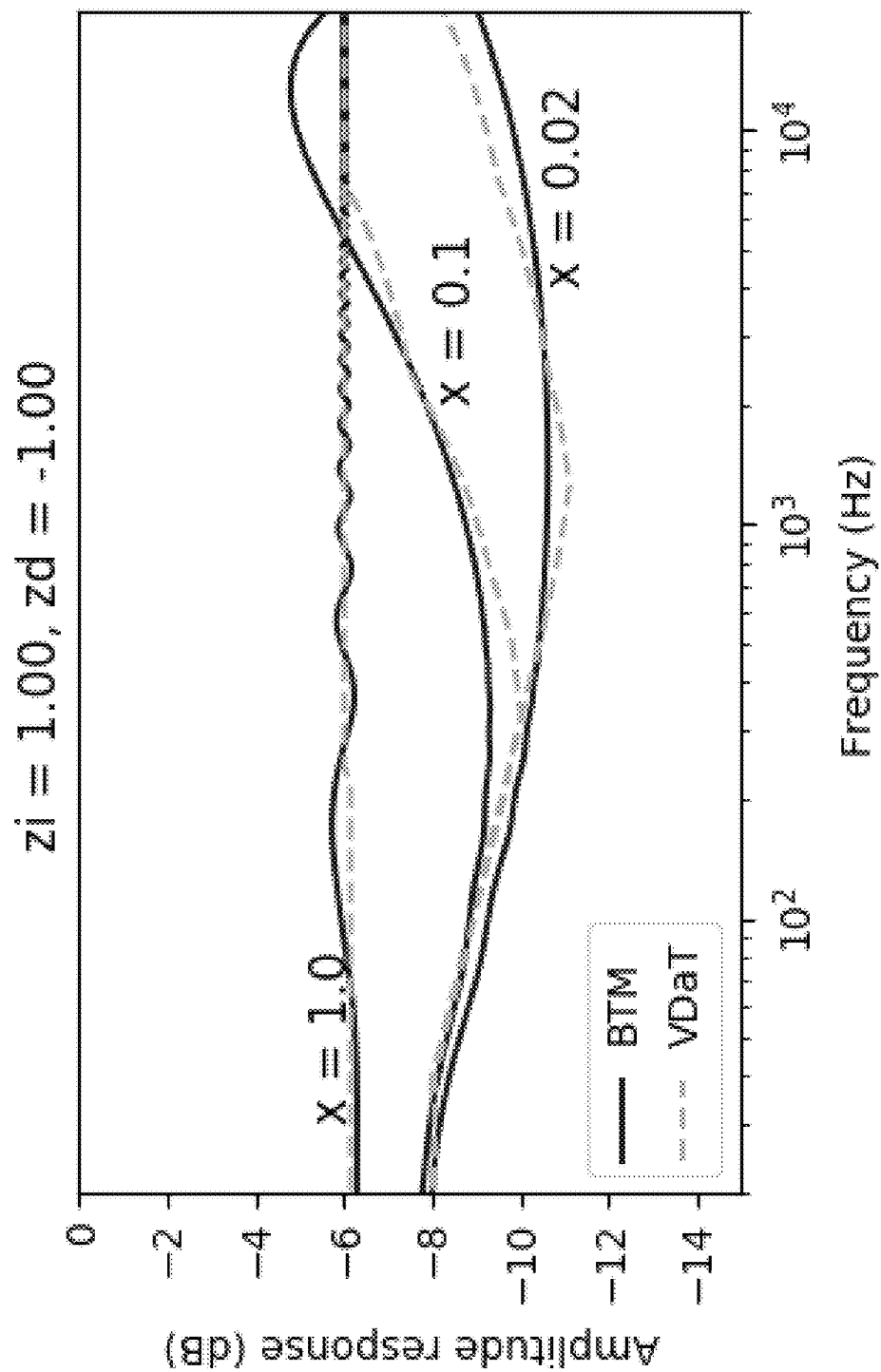

We first consider an infinite half-plane, which stands in for any thin object with long edges. FIGS. 11 and 12 show results for normal and non-shadowed diffraction over two orders of magnitude each of $l_s$, the direct path length, and x, the distance from the diffracting edge to the direct path.

For shadowed diffraction, the average error in the VDaT amplitude response as compared to BTM is 1.8 dB FW-LSD (FIG. 11). For non-shadowed diffraction, the results are even better (FIG. 12). The worst cases, with up to 3.4 dB FW-LSD, are for high frequencies in the large, asymmetrical case (upper right in FIG. 11), which VDaT does not distinguish from the symmetrical case (upper left in FIG. 11).

FIG. 11 shows BTM and VDaT amplitude responses of diffraction by an infinite half-plane. The three rows are three different size scales; the two columns are the symmetrical and asymmetrical cases of placement of the half-plane along the direct path. The seven cases shown in each plot are for the half-plane cutting the direct path by [0.02, 0.05, 0.1, 0.2, 0.5, 1.0, and 2.0] m, from top to bottom.

FIG. 12 shows BTM and VDaT amplitude responses of non-shadowed diffraction by an infinite half-plane, for the symmetrical case with $l_s=2$ m. x is the distance from the direct path to the diffracting edge. This is a case VDaT handles well; the average FW-LSD for these three cases is 0.34 dB.

Figure 13:
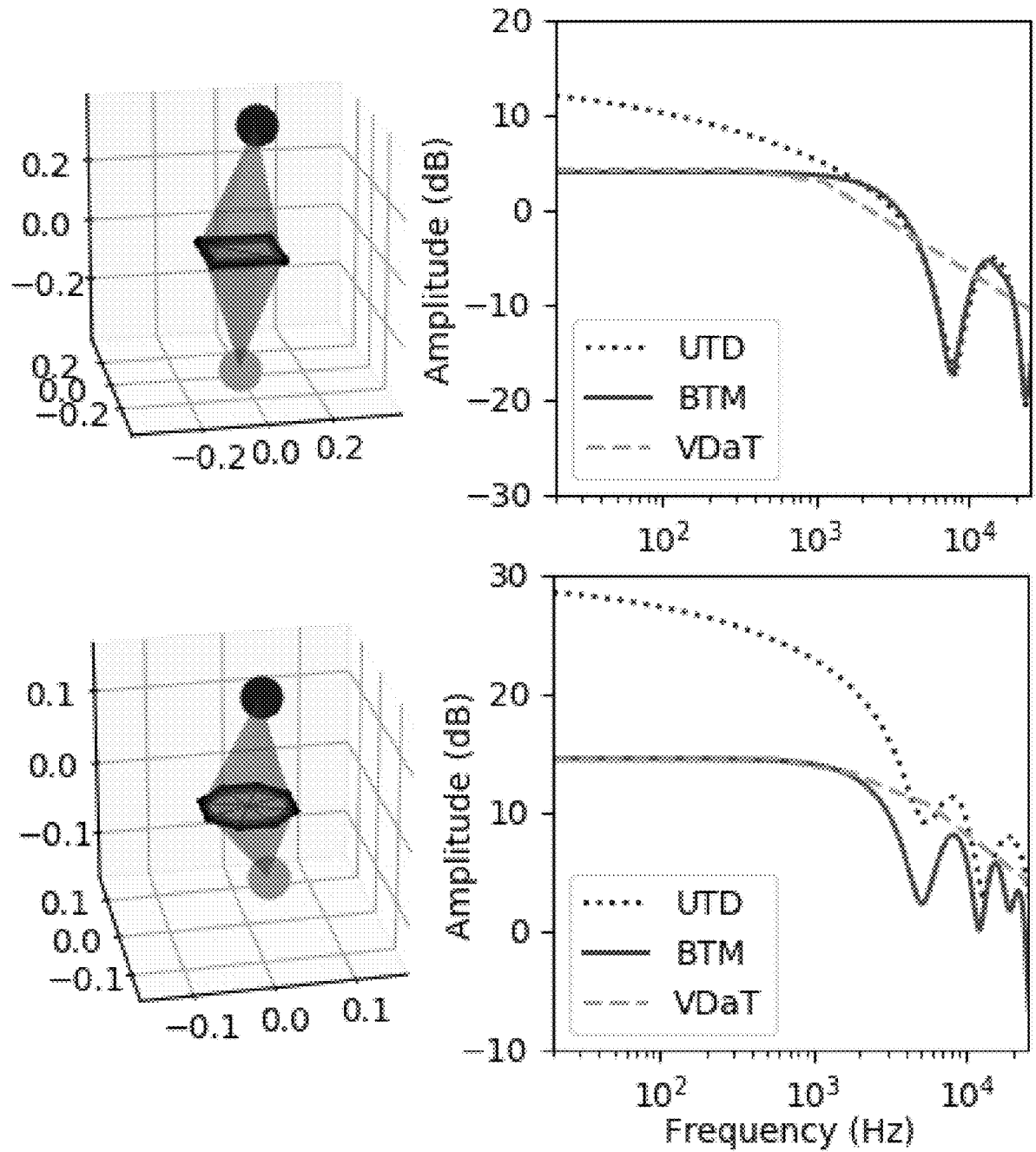
FIG. 13 shows diffraction amplitude responses around two small objects as determined using different edge diffraction techniques.

FIG. 13 shows diffraction amplitude responses around two small objects (3D plots in meters), as determined by UTD, BTM, and VDaT. VDaT matches the overall shape of the BTM response, without the interference effects. UTD assumes the objects' edges are infinite, resulting in large error.

As discussed above, the UTD diffraction technique assumes all edges are of infinite length. As a result, its amplitude response results have substantial error for small objects. FIG. 13 shows two such cases, in which the direct path is obliquely and non-symmetrically occluded by small thin plates of different sizes and shapes. In both, VDaT approximates the BTM results (FW-LSD 2.6 dB top/2.5 dB bottom) much more closely than UTD does (4.3 dB top/10.0 dB bottom), while retaining a much lower computational complexity. Furthermore, if the mesh moves such that the apex point of one of the UTD edge diffraction paths moves outside the bounds of its edge, UTD will abruptly delete that path, and there will be a discontinuity in the output. Neither BTM nor VDaT exhibit such discontinuities with moving small objects.

As mentioned above, BTM produces sharp interference effects as a result of the diffraction paths around the different edges being summed. VDaT tends to produce a smooth "averaged" response designed to approximate responses which can be obtained in real-world environments. Most real-world environments are complex, and this complexity tends to perform an averaging effect like VDaT. Since real situations where sharp interference effects are audible are very rare, these effects in an acoustical environment may sound "Wrong," especially when objects are moving and the peaks sweep across frequency. VDaT avoids this situation and may better match users' perceptual expectations.

Most real-time edge diffraction (ED) implementations ignore all non-shadowed diffraction, as non-shadowed diffraction vastly expands the number of edges that must be considered at each step of higher-order edge diffraction. Instead, they use a heuristic that adjusts the level of the diffracted field in the shadow region so that its amplitude is continuous with the direct sound at the shadow boundary. However, non-shadowed diffraction-especially non-shadowed higher-order diffraction-plays an important role when there is a small gap or hole in a large occluder. If non-shadowed diffraction is ignored, the sound will always be fully open (unfiltered) when the direct path is open, or receive diffraction filtering based on the closer edge, regardless of the size of the gap or hole. This leads to the absurd result of the sound remaining constant while the gap or hole is shrinking to zero (FIG. 14).

Figure 14:
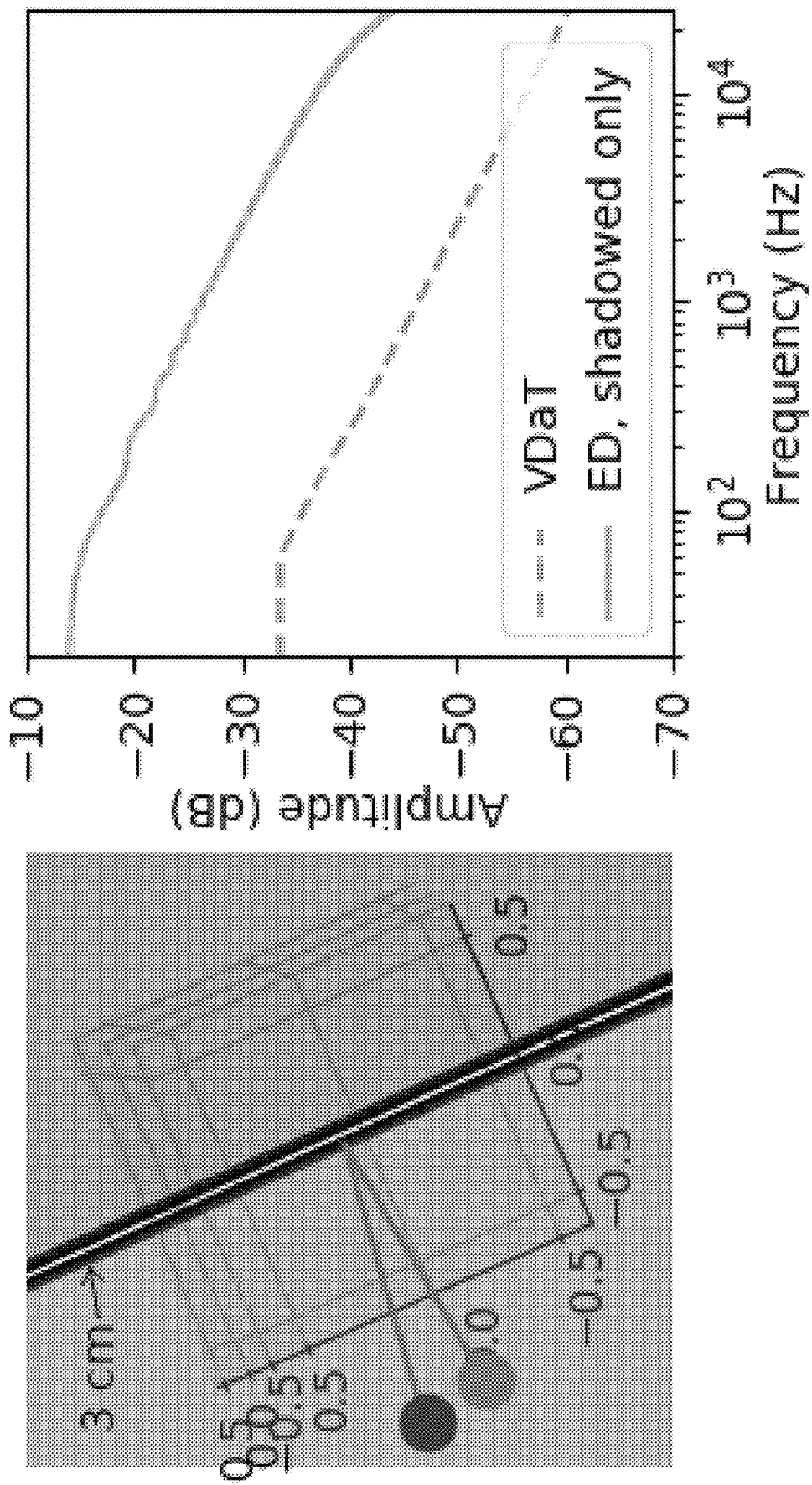
FIG. 14 shows a comparison of amplitude responses for diffraction on a slit for two edge diffraction techniques.

FIG. 14 shows a comparison of amplitude responses for diffraction on a slit for two edge diffraction techniques. Most real-time ED systems, based on UTD or BTM, ignore non-shadowed diffraction edges. For the slit shown in FIG. 14, they ignore the right edge, meaning the amplitude response does not change as the slit shrinks to zero. In contrast, the VDaT amplitude response correctly falls to zero as the slit shrinks to zero. VDaT does handle non-shadowed diffraction near the shadow boundary. Note that even BTM does not compute correct results for the small gap or hole without additional considerations.

Figure 15:
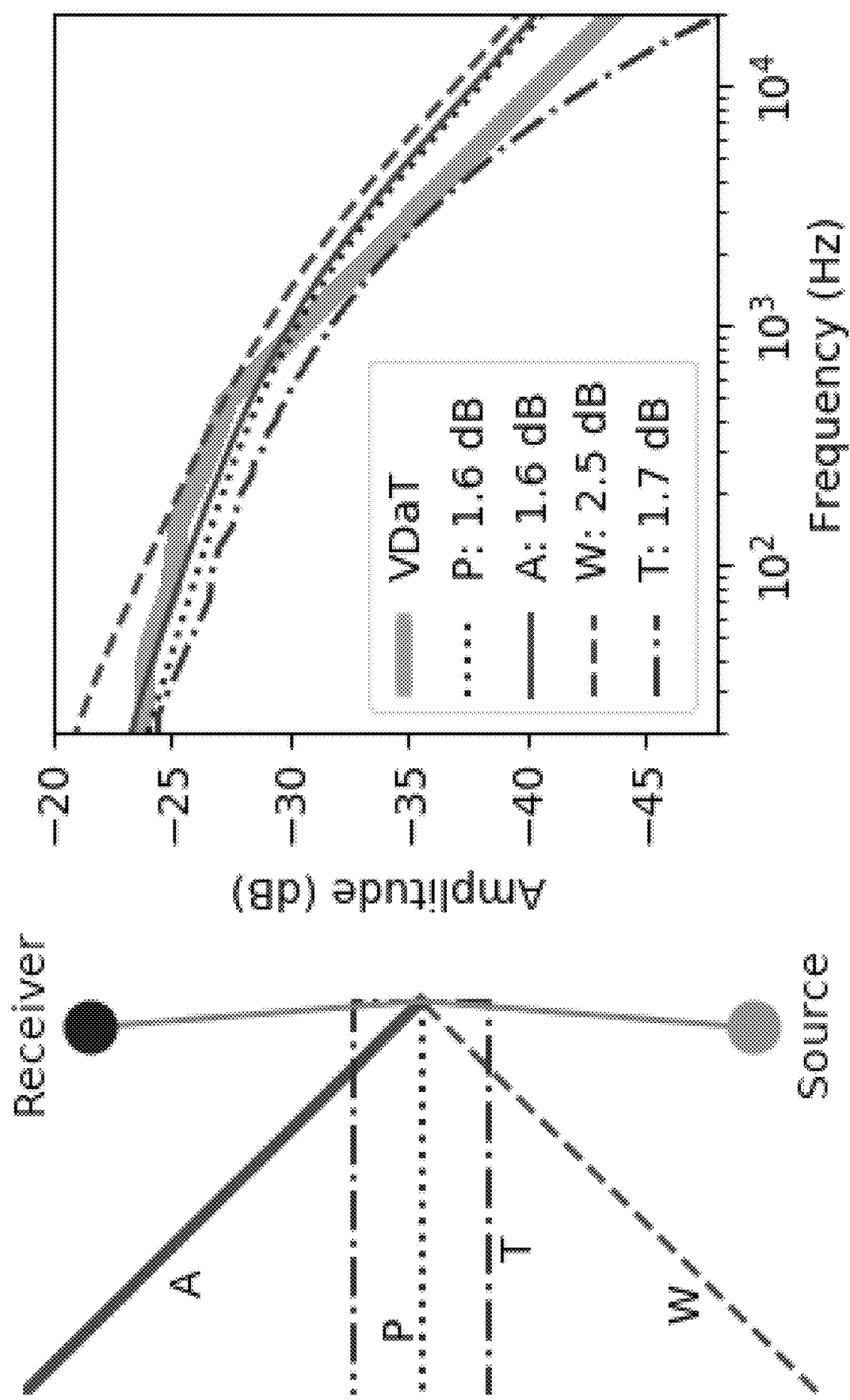
FIG. 15 shows amplitude responses for diffraction on different occluders according to different edge diffraction techniques.

FIG. 15 shows three examples of other types of objects occluding the direct path: a plane A at 45° to the direct path, a wedge W with a 90° inner angle, and a 2-m thick object T undergoing second-order diffraction. When using only subpath 0 (see FIG. 4), the same set of subpaths is blocked in each of these cases. The BTM results for these cases are similar, and the VDaT results fall among them when the source and receiver are sufficiently removed from the surfaces, resulting in errors below 3 dB FW-LSD. Some example embodiments may use information about where triangle intersections occurred along subsegments, as well as comparisons between transmissions over different subpaths, to provide more refined estimates of the shape of the objects near the direct path.

FIG. 15 shows amplitude responses for diffraction on different occluders according to different edge diffraction techniques. In FIG. 15, the direct path ($l_s$=10 m) is occluded by x=0.4 m by four different objects: plane P, angled plane A, wedge W, and thick object T.

As a result of the spatial sampling hierarchy described above, the cost of computing the VDaT spatial sampling for one original path segment is $N_r \cdot N_a \cdot N_{ss} \cdot I(t)$, where $I(t)$ is the cost of determining which triangles in the scene intersect a given line segment [which can be O(log t) or better]. The remaining operations in VDaT are all of constant complexity per original path segment, regardless of the scene complexity, so the overall complexity of VDaT is $$C_{VDaT} \propto s \cdot I(t) \cdot N_r N_a N_{ss}, \quad (26)$$

where s is the number of original path segments (direct paths plus segments of specular reflection paths). Compare this to Eqs. (1) and (2); in VDaT the power-law term $\eta^o$ is missing, and the "quality" parameters $N_r$, $N_a$, and $N_{ss}$ in VDaT only affect the performance linearly as opposed to exponentially in $N_o$. Note also that since each of the subsegments in VDaT is independent of the others, the ray tracing can be parallelized across all of them.

In some example embodiments, the generation of direct and/or reflected paths as the input to VDaT includes generation of transmission paths through obstacles. This is because VDaT operates on existing path segments, particularly ones that are occluded by scene objects. In reality, many solid objects (such as building walls) do perceptibly transmit sound, especially at low frequencies. As a result, transmission paths will have to be computed for many objects for realistic results using any approach, so the penalty of computing transmission paths for all objects for VDaT in some example embodiments may not be very high.

VDaT was created as the method of estimating sound diffraction and transmission in the real-time audio spatialization acoustical system Space3D. This system can deliver high-quality spatialization results over speaker arrays or headphones and incorporate high-order reflections, diffraction and transmission, material properties, directional sound sources, Doppler, and more in fully dynamic scenes. Space3D can perform all geometry and audio processing on graphics processing units (GPUs) using, e.g., NVIDIA CUDA. Some example implementations of methods according to the present disclosure can recompute all paths and perform all audio processing in 11.6 ms by default (frame length of 512 spls @ 44.1 kHz); much longer frames than this may lead to perceptible delays between audio and visuals. Approaches such as caching schemes or lower scene update frame rates can be very effective at amortizing the computational load across multiple frames, but these approaches may limit how dynamic the scene can be.

A low-complexity mesh, like the type typically used for computing collisions in interactive multi-media applications, may be used for the GA audio processing. This mesh may be created by the artist, or automatically generated in a preprocessing step by simplification of a visual mesh for static portions of the scene. Note that unlike UTD, methods and systems according to the disclosed technology do not require that the simplified mesh have no small edges or small objects; the goal is to eliminate any detail that is not acoustically relevant.

P represents the number of actual, valid paths having audio propagated along them, which in our example of real-time scenes ranges from 100 to 635. In contrast, Monte Carlo implementations typically trace on the order of 1,000 visibility paths per frame and can handle tens or hundreds of thousands of triangles, but often produce only a handful of resulting acoustical paths. Furthermore, VDaT determines diffraction and transmission on every one of the hundreds or thousands of segments of these paths, still in real time and with no precomputation. In the Cathedral2 case, this represents a total of $s \cdot N_r \cdot N_a \cdot N_{ss}$=2.41 million VDaT subsegments and 82.2×10$^6$ segment-triangle intersections-all completed in 6.8 ms.

FIGS. 1A and 1B show the real part of the soundfield determined using Space3D and VDaT for diffraction around a large object, so the generated sound waves are visible. The fact that they appear to emanate from the diffracting edge is evidence of the success of VDaT's path length estimation algorithm.

TABLE II

VDaT timing on real-time scenes. S/K = number of sources/receivers; P = number
of paths; s = number of direct + reflection path segments. Conditions: $N_r = 9$, $N_a = 32$,
$N_{sp} = 1$ ($N_{ss} = 3$), 512 spl buffers @ 44.1 kHz → 11.6 ms/frame, NVIDIA GTX 1080.

| Name | Scene | | | Complexity | | Time (ms) | |
|---|---|---|---|---|---|---|---|
| | t | $N_o$ | S/K | P | s | VDaT | Total |
| Shoebox | 12 | 6 | 1/1 | 377 | 2183 | 4.7 | 8.2 |
| Cathedral 2 | 34 | 4 | 2/1 | 635 | 2797 | 6.8 | 10.1 |
| Hall 1 | 50 | 4 | 2/1 | 220 | 941 | 3.4 | 10.2 |
| Cathedral 1 | 190 | 3 | 1/1 | 158 | 570 | 5.2 | 8.6 |
| BasicCity | 1024 | 2 | 2/1 | 100 | 278 | 9.9 | 11.2 |

Edge-diffraction techniques, especially the BTM one, suffer from high computational complexity, severely limiting their use in real-time applications. Disclosed embodiments provide an alternative VDaT technique for approximating diffraction. It operates by spatially sampling the scene around the direct or reflected path segment and using the results to estimate the edge-diffraction amplitude response and path length for that scene. Its results match BTM to within 1-3 dB over a wide range of scales in basic cases, and it can handle small objects and gaps in obstacles better than existing real-time diffraction systems including BTM. Furthermore, its performance is high enough that it can determine diffraction for thousands of higher-order reflection path segments in a handful of milliseconds on consumer-grade GPU hardware, without needing any precomputed information about the scene. As a result, VDaT is a tool of choice for incorporation of diffraction effects into hard real-time applications with arbitrary, fully dynamic scenes, such as virtual reality and other interactive multimedia.

FIG. 16 illustrates a block diagram of a device 1600 which can be used to implement, at least in-part, some of the various disclosed embodiments. The device in FIG. 16 can, for example, be implemented as a part of a sound generation system or as a part of an AR/VR system. The device 1600 comprises at least one processor or controller 1604, at least one memory unit 1602 that is in communication with the processor 1604, and at least one communication unit 1606 that enables exchange of data and information, directly or indirectly, through the communication link 1608 with other entities, devices, databases and networks. The communication unit 1606 may provide wired and/or wireless communication capabilities in accordance with one or more communication protocols, and therefore it may comprise the corresponding transmitter/receiver, antennas, circuitry and ports, as well as the encoding/decoding capabilities that may be necessary for transmission and/or reception of data and other information. The example device 1600 of FIG. 16 may be integrated as part of any device or system according to the disclosed technology to carry out any of the disclosed methods, including receiving information and/or electrical signals corresponding to a scene around the device 1600, for example (and/or corresponding to a virtual scene), and processing those signals and information to implement any of the methods according to the technology disclosed in this patent document.

FIG. 17 shows a flow diagram of an example embodiment of a method 1700 of estimating diffraction of sound waves that travel from a first point to a second point in an environment that includes one or more objects, according to the disclosed technology. The method 1700 includes a process 1710 of obtaining a path between the first point and the second point. The method 1700 also includes a process 1720 of selecting a plurality of distance values associated with the path. The method 1700 further includes a process 1730 which includes, for each distance value: generating a subpath that passes through a third point located between the first point and the second point, wherein a separation between the third point and the path is equal to the distance value; and determining, for the subpath, a transmission value corresponding to a degree of occlusion of the subpath by the one or more objects. Furthermore, the method 1700 includes a process 1740 of determining a value of a diffraction amplitude response for propagation of the sound waves between the first point and the second point using a first transmission value determined for a first subpath generated for a first distance value and a second transmission value determined for a second subpath generated for a second distance value, wherein the second distance value is different from the first distance value.

An aspect of the disclosed embodiments relates to a system for estimating sound propagation between a source and a receiver in a scene, including a processor and a memory comprising processor executable code, wherein the processor executable code, when executed by the processor, causes the processor to: obtain, for each ring in one or more rings having their centers on a line connecting the source and the receiver, and for each angle in one or more angles around the line, transmission information corresponding to the ring and the angle by: generating one or more paths corresponding to the ring and the angle, wherein each path in the one or more paths connects the source and the receiver; and determining, for each path in the one or more paths, if the path is occluded by an object in the scene, wherein radii of any two rings in the one or more rings are different from each other; and compute a frequency-amplitude response for sound propagation from the source to the receiver in the scene using a function approximating an edge diffraction model at size scales corresponding to the radii of the rings in the one or more rings and using the transmission information, wherein the function approximating the edge diffraction model at a size scale is a function of the size scale and a separation between the source and the receiver.

In some example embodiments, the processor executable code, when executed by the processor, also causes the processor to: obtain a diffraction path length corresponding to the source and the receiver. In an example embodiment, the processor executable code, when executed by the processor, also causes the processor to: compute the frequency-amplitude response for sound propagation from the source to the receiver without using any precomputed information about the scene. According to some example embodiments, the edge diffraction model is the Biot-Tolstoy-Medwin (BTM) edge diffraction model. In some example embodiments, for any two rings in the one or more rings, wherein a radius of a first ring in the two rings is larger than a radius of a second ring in the two rings, a ratio of the first radius to the second radius is a power of two.

Another aspect of the disclosed embodiments relates to a system for estimating sound propagation between a source and a receiver in a scene, including a processor and a memory comprising processor executable code, wherein the processor executable code, when executed by the processor, causes the processor to: spatially sample the scene around a path between the source and the receiver at one or more distance scales from the path using ray tracing; determine, for each distance scale in the one or more distance scales, a predominant shape associated with an object for the distance scale based on the spatial sampling, wherein the object is located proximate to the path; and compute a frequency-amplitude response for sound propagation from the source to the receiver in the scene based on the spatial sampling and using a function approximating an edge diffraction model for the predominant shape associated with the object for each distance scale in the one or more distance scales.

In some example embodiments, the predominant shape is one of a disk or a hole. According to some example embodiments, the processor executable code, when executed by the processor, also causes the processor to: compute the frequency-amplitude response for sound propagation from the source to the receiver without using any precomputed information about the scene. In an example embodiment, the edge diffraction model is the Biot-Tolstoy-Medwin (BTM) edge diffraction model. In some example embodiments, the function approximating the edge diffraction model for the predominant shape associated with the object for a distance scale is a function of the distance scale and a separation between the source and the receiver. In an example embodiment, the processor executable code, when executed by the processor, also causes the processor to: obtain a diffraction path length corresponding to the source and the receiver.

Yet another aspect of the disclosed embodiments relates to a method of estimating diffraction of sound waves that travel from a first point to a second point in an environment that includes one or more objects, the method comprising: obtaining a path between the first point and the second point; selecting a plurality of distance values associated with the path; for each distance value: generating a subpath that passes through a third point located between the first point and the second point, wherein a separation between the third point and the path is equal to the distance value; and determining, for the subpath, a transmission value corresponding to a degree of occlusion of the subpath by the one or more objects; and determining a value of a diffraction amplitude response for propagation of the sound waves between the first point and the second point using a first transmission value determined for a first subpath generated for a first distance value and a second transmission value determined for a second subpath generated for a second distance value, wherein the second distance value is different from the first distance value.

In some example embodiments, for each distance value from the plurality of distance values, the subpath generated for the distance value is such that the maximum distance between the subpath and the path is equal to the distance value. According to some example embodiments, the path between the first point and the second point is a straight line. In an example embodiment, for any two distance values from the plurality of distance values, a ratio of a distance value from the two distance values to another distance value from the two distance values is a power of a same numeric value. In some example embodiments, the same numeric value is 2. According to an example embodiment, the method further comprises generating, for each distance value from the plurality of distance values, one or more additional subpaths between the first point and the second point, wherein each subpath from the one or more additional subpaths passes through a point of the environment which is at a separation from the path equal to the distance value. In some example embodiments, the path, a first subpath generated for a distance value from the plurality of distance values and a second subpath generated for the distance value from the plurality of distance values are located on a same plane. According to some example embodiments, a first subpath generated for a distance value from the plurality of distance values is located on a first plane and a second subpath generated for the distance value from the plurality of distance values is located on a second plane which is different from the first plane. In some example embodiments, a subpath generated for a distance value from the plurality of distance values includes one or more subsegments. According to some example embodiments, each subsegment from the one or more subsegments is a straight line. In an example embodiment, the transmission value for the subpath is determined using transmission values for each subsegment from the one or more subsegments. According to an example embodiment, a transmission value for a subsegment from the one or more subsegments corresponds to a first numeric value when the subsegment intersects an object from the one or more objects and the transmission value for the subsegment corresponds to a second numeric value when the subsegment does not intersect any object from the one or more objects, and wherein the second numeric value is different from the first numeric value. In some example embodiments, the first numeric value is zero. According to some example embodiments, the first numeric value corresponds to a degree of transmission of sound at a sound frequency through the object from the one or more objects. In an example embodiment, the transmission value is a function of sound frequency. In some example embodiments, the method also comprises determining a diffraction path length using transmission values determined for subpaths generated for the plurality of distance values. According to an example embodiment, said determining the value of the diffraction amplitude response is performed using a difference between the first transmission value and the second transmission value.

An aspect of the disclosed embodiments relates to a system for estimating diffraction of sound waves that travel from a first point to a second point in an environment that includes one or more objects, comprising: a processor; and a memory comprising processor executable instructions which, upon execution by the processor, cause the processor to: obtain a path between the first point and the second point; select a plurality of distance values associated with the path; for each distance value: generate a subpath that passes through a third point located between the first point and the second point, wherein a separation between the third point and the path is equal to the distance value; and determine, for the subpath, a transmission value corresponding to a degree of occlusion of the subpath by the one or more objects; and determine a value of a diffraction amplitude response for propagation of the sound waves between the first point and the second point using a first transmission value determined for a first subpath generated for a first distance value and a second transmission value determined for a second subpath generated for a second distance value, wherein the second distance value is different from the first distance value.

In some example embodiments, for each distance value from the plurality of distance values, the subpath generated for the distance value is such that the maximum distance between the subpath and the path is equal to the distance value. According to some example embodiments, for any two distance values from the plurality of distance values, a ratio of a distance value from the two distance values to another distance value from the two distance values is a power of a same numeric value. In an example embodiment, the same numeric value is 2. In some example embodiments, the processor executable instructions, upon execution by the processor, cause the processor to generate, for each distance value from the plurality of distance values, one or more additional subpaths between the first point and the second point, wherein each subpath from the one or more additional subpaths passes through a point of the environment which is at a separation from the path equal to the distance value. According to an example embodiment, the path, a first subpath generated for a distance value from the plurality of distance values and a second subpath generated for the distance value from the plurality of distance values are located on a same plane. In some example embodiments, a first subpath generated for a distance value from the plurality of distance values is located on a first plane and a second subpath generated for the distance value from the plurality of distance values is located on a second plane which is different from the first plane. According to some example embodiments, a subpath generated for a distance value from the plurality of distance values includes one or more subsegments. In an example embodiment, the transmission value for the subpath is determined using transmission values for each subsegment from the one or more subsegments. According to some example embodiments, a transmission value for a subsegment from the one or more subsegments corresponds to a first numeric value when the subsegment intersects an object from the one or more objects and the transmission value for the subsegment corresponds to a second numeric value when the subsegment does not intersect any object from the one or more objects, and wherein the second numeric value is different from the first numeric value. In some example embodiments, the first numeric value corresponds to a degree of transmission of sound at a sound frequency through the object from the one or more objects. According to an example embodiment, the transmission value is a function of sound frequency. In an example embodiment, the processor executable instructions, upon execution by the processor, cause the processor to determine a diffraction path length using transmission values determined for subpaths generated for the plurality of distance values. In some example embodiments, said determine the value of the diffraction amplitude response is performed using a difference between the first transmission value and the second transmission value.

Some of the disclosed devices or modules can be implemented as hardware, software, or combinations thereof. For example, a hardware implementation of electronic devices can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that are known in the art, including, but not limited to, communications over the Internet, wired, or wireless networks using the appropriate protocols.

Various information and data processing operations described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. A method of estimating diffraction of sound waves that travel from a first point to a second point in an environment that includes one or more objects, the method comprising:
   obtaining a path between the first point and the second point;
   selecting a plurality of distance values associated with the path;
   for each distance value:
      generating a subpath that passes through a third point located between the first point and the second point, wherein a separation between the third point and the path is equal to the distance value; and determining, for the subpath, a transmission value corresponding to a degree of occlusion of the subpath by the one or more objects; and determining a value of a diffraction amplitude response for propagation of the sound waves between the first point and the second point using a first transmission value determined for a first subpath generated for a first distance value and a second transmission value determined for a second subpath generated for a second distance value, wherein the second distance value is different from the first distance value.

2. The method of claim 1, wherein, for each distance value from the plurality of distance values, the subpath generated for the distance value is such that the maximum distance between the subpath and the path is equal to the distance value.

3. The method of claim 1, wherein the path between the first point and the second point is a straight line.

4. The method of claim 1, wherein, for any two distance values from the plurality of distance values, a ratio of a distance value from the two distance values to another distance value from the two distance values is a power of a same numeric value.

5. The method of claim 4, wherein the same numeric value is 2.

6. The method of claim 1, comprising generating, for each distance value from the plurality of distance values, one or more additional subpaths between the first point and the second point, wherein each subpath from the one or more additional subpaths passes through a point of the environment which is at a separation from the path equal to the distance value.

7. The method of claim 6, wherein the path, a first subpath generated for a distance value from the plurality of distance values and a second subpath generated for the distance value from the plurality of distance values are located on a same plane.

8. The method of claim 6, wherein a first subpath generated for a distance value from the plurality of distance values is located on a first plane and a second subpath generated for the distance value from the plurality of distance values is located on a second plane which is different from the first plane.

9. The method of claim 1, wherein a subpath generated for a distance value from the plurality of distance values includes one or more subsegments.

10. The method of claim 9, wherein each subsegment from the one or more subsegments is a straight line.

11. The method of claim 9, wherein the transmission value for the subpath is determined using transmission values for each subsegment from the one or more subsegments.

12. The method of claim 11, wherein a transmission value for a subsegment from the one or more subsegments corresponds to a first numeric value when the subsegment intersects an object from the one or more objects and the transmission value for the subsegment corresponds to a second numeric value when the subsegment does not intersect any object from the one or more objects, and wherein the second numeric value is different from the first numeric value.

13. The method of claim 12, wherein the first numeric value is zero.

14. The method of claim 12, wherein the first numeric value corresponds to a degree of transmission of sound at a sound frequency through the object from the one or more objects.

15. The method of claim 1, wherein the transmission value is a function of sound frequency.

16. The method of claim 1, comprising determining a diffraction path length using transmission values determined for subpaths generated for the plurality of distance values.

17. The method of claim 1, wherein said determining the value of the diffraction amplitude response is performed using a difference between the first transmission value and the second transmission value.

18. A system for estimating diffraction of sound waves that travel from a first point to a second point in an environment that includes one or more objects, comprising:
   a processor; and
   a memory comprising processor executable instructions which, upon execution by the processor, cause the processor to:
      obtain a path between the first point and the second point;
      select a plurality of distance values associated with the path;
      for each distance value:
         generate a subpath that passes through a third point located between the first point and the second point, wherein a separation between the third point and the path is equal to the distance value; and
         determine, for the subpath, a transmission value corresponding to a degree of occlusion of the subpath by the one or more objects; and
      determine a value of a diffraction amplitude response for propagation of the sound waves between the first point and the second point using a first transmission value determined for a first subpath generated for a first distance value and a second transmission value determined for a second subpath generated for a second distance value, wherein the second distance value is different from the first distance value.

19. The system of claim 18, wherein, for each distance value from the plurality of distance values, the subpath generated for the distance value is such that the maximum distance between the subpath and the path is equal to the distance value.

20. The system of claim 18, wherein, for any two distance values from the plurality of distance values, a ratio of a distance value from the two distance values to another distance value from the two distance values is a power of a same numeric value.

21. The system of claim 18, wherein the processor executable instructions, upon execution by the processor, cause the processor to generate, for each distance value from the plurality of distance values, one or more additional subpaths between the first point and the second point, wherein each subpath from the one or more additional subpaths passes through a point of the environment which is at a separation from the path equal to the distance value.

22. The system of claim 18, wherein a subpath generated for a distance value from the plurality of distance values includes one or more subsegments.

23. The system of claim 22, wherein the transmission value for the subpath is determined using transmission values for each subsegment from the one or more subsegments.

24. The system of claim 23, wherein a transmission value for a subsegment from the one or more subsegments corresponds to a first numeric value when the subsegment intersects an object from the one or more objects and the transmission value for the subsegment corresponds to a second numeric value when the subsegment does not intersect any object from the one or more objects, and wherein the second numeric value is different from the first numeric value.

25. The system of claim 24, wherein the first numeric value corresponds to a degree of transmission of sound at a sound frequency through the object from the one or more objects.

26. The system of claim 18, wherein the processor executable instructions, upon execution by the processor, cause the processor to determine a diffraction path length using transmission values determined for subpaths generated for the plurality of distance values.

\* \* \* \* \*